United States Patent [19]

Mizuno et al.

[11] Patent Number: 5,515,500
[45] Date of Patent: May 7, 1996

[54] RECORDING APPARATUS AND METHOD FOR AN ARRAYED RECORDING APPARATUS

[75] Inventors: Masahiro Mizuno; Shiro Ogura; Kazuhiko Ito; Akira Ogawa; Toshio Matsumoto; Hiroshi Baba, all of Kanagawa, Japan

[73] Assignee: Mitsubishi Denki Kabushiki Kaisha, Tokyo, Japan

[21] Appl. No.: 243,416

[22] Filed: May 16, 1994

[30] Foreign Application Priority Data

May 24, 1993 [JP] Japan ..................................... 5-121502

[51] Int. Cl.$^6$ .................................................. G06F 11/20
[52] U.S. Cl. ..................... 395/182.05; 371/10.2
[58] Field of Search .................................. 371/10.1, 10.2; 395/575, 428

[56] References Cited

U.S. PATENT DOCUMENTS

| | | | |
|---|---|---|---|
| 5,257,391 | 10/1993 | DuLac et al. | 395/575 |
| 5,274,799 | 12/1993 | Brant et al. | 395/575 |
| 5,341,381 | 8/1994 | Fuller | 371/10.1 |
| 5,388,108 | 2/1995 | DeMoss et al. | 371/10.2 |

FOREIGN PATENT DOCUMENTS 0569313 11/1993 European Pat. Off. .

OTHER PUBLICATIONS

Patterson, Gibson & Katz "A Case For Redundant Arrays of Inexpensive Disks," Dec. 1987, Computer Science Div. U. of California.

*Primary Examiner*—Vincent P. Canney
*Attorney, Agent, or Firm*—Wolf, Greenfield & Sacks

[57] ABSTRACT

The present invention relates to an arrayed recording apparatus with reduced writing time. Various devices are used to write data without redundant data and to update the redundant data more efficiently during idle time. In one embodiment, a temporary write track is provided for each cylinder. When data are read, updated and re-written, the data are re-written to the temporary write track. Since the re-writing does not require a full disk rotation, the writing occurs quickly. Data in the temporary write track are relocated into the disk during an idle state, without being synchronized. Additionally, corresponding blocks in data areas can be used for writing data rather than a specified temporary write track. In order to improve re-writing time, the rotation of the disk drives can be synchronized to avoid full rotations between reads and writes, or cache memories for each disk can be used. When data is accessed from a host computer in a first unit size and from the memory devices in a second unit size, a buffer and cache can be used to limit the written data to those portions of the second unit size which have been changed. Each of these devices reduces the total access time for writing to arrayed recording devices.

28 Claims, 34 Drawing Sheets

FIG. 2
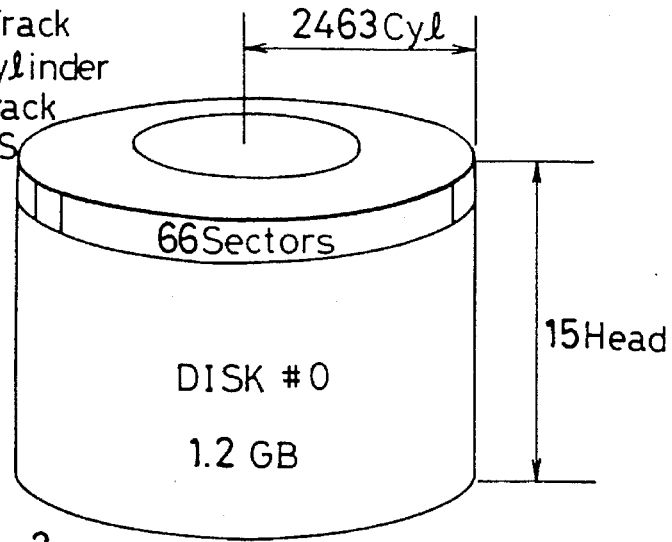
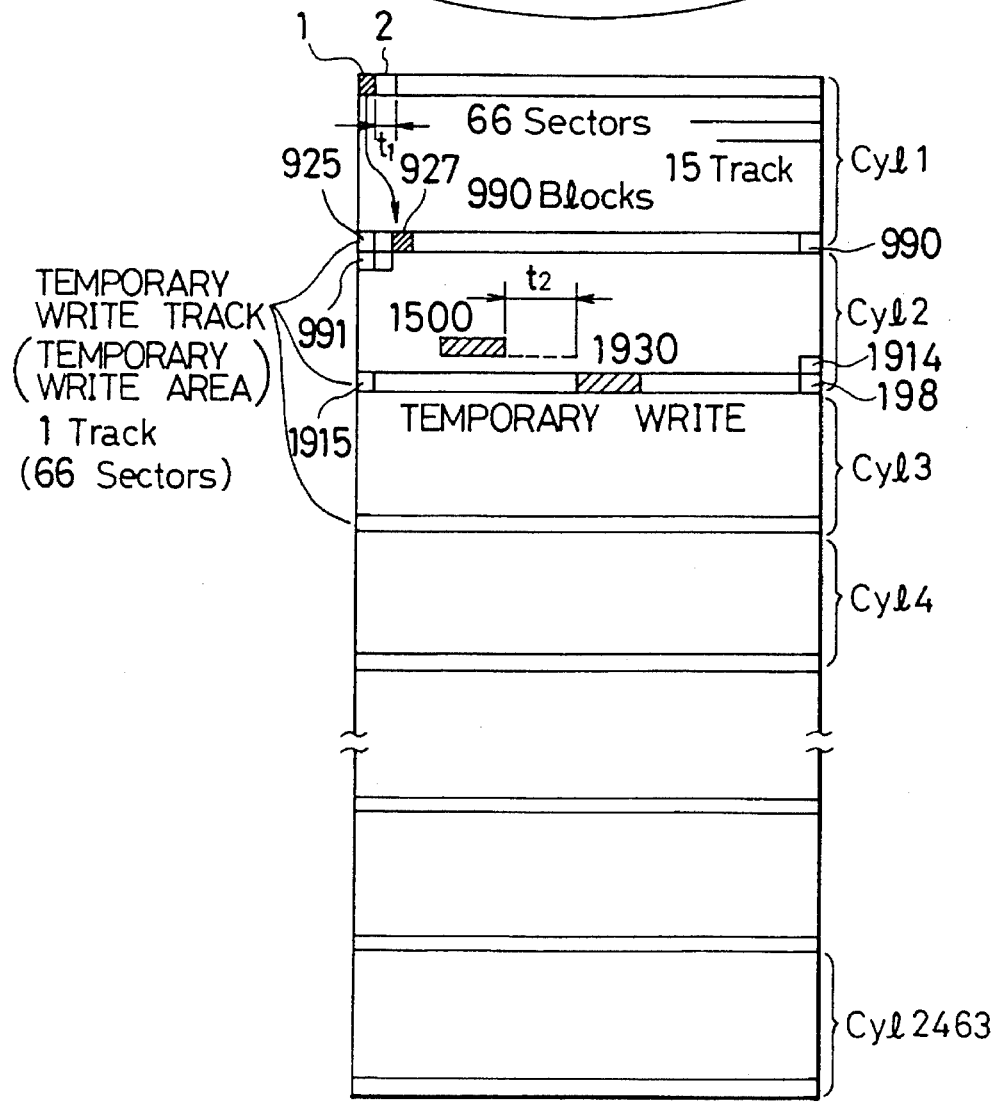

FIG. 4

TEMPORARY WRITE INFORMATION TABLE

DISK #2
DISK #1
DISK #0

| WRITE ADDRESS | TEMPORARY WRITE ADDRESS | TIME |
|---|---|---|
| 1 | 927 | 0.75 MS |
| 1500 | 1930 | 4.00 MS |
| 1501 | 1931 | 4.25 MS |
| 1502 | 1932 | 4.50 MS |
| 1503 | 1933 | 4.75 MS |
| ⋮ | ⋮ | ⋮ |

FIG. 4

TEMPORARY WRITE INFORMATION TABLE

DISK #2

DISK #1

| DISK #0 | | |
|---|---|---|
| WRITE ADDRESS | TEMPORARY WRITE ADDRESS | TIME |
| 1 | 927 | 0.75 MS |
| 1500 | 1930 | 4.00 MS |
| 1501 | 1931 | 4.25 MS |
| 1502 | 1932 | 4.50 MS |
| 1503 | 1933 | 4.75 MS |
| ⋮ | ⋮ | ⋮ |

FIG. 7
512 Byte / Block
66 Sector / Track
15 Track / Cylinder
40 KByte / Track
DISK 8 PLATES
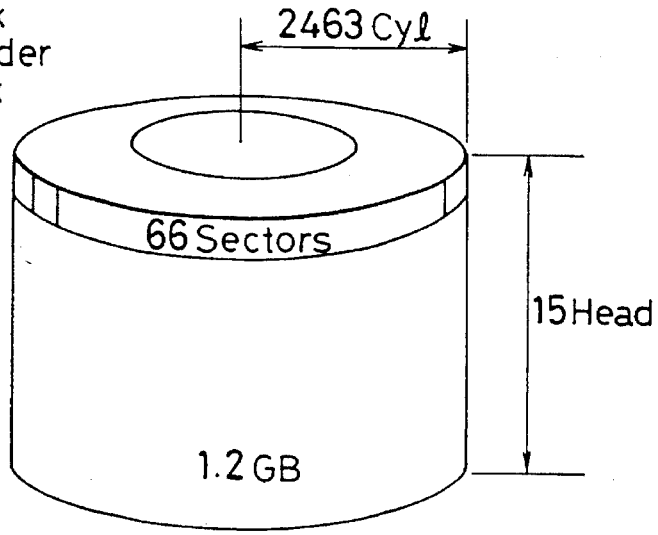
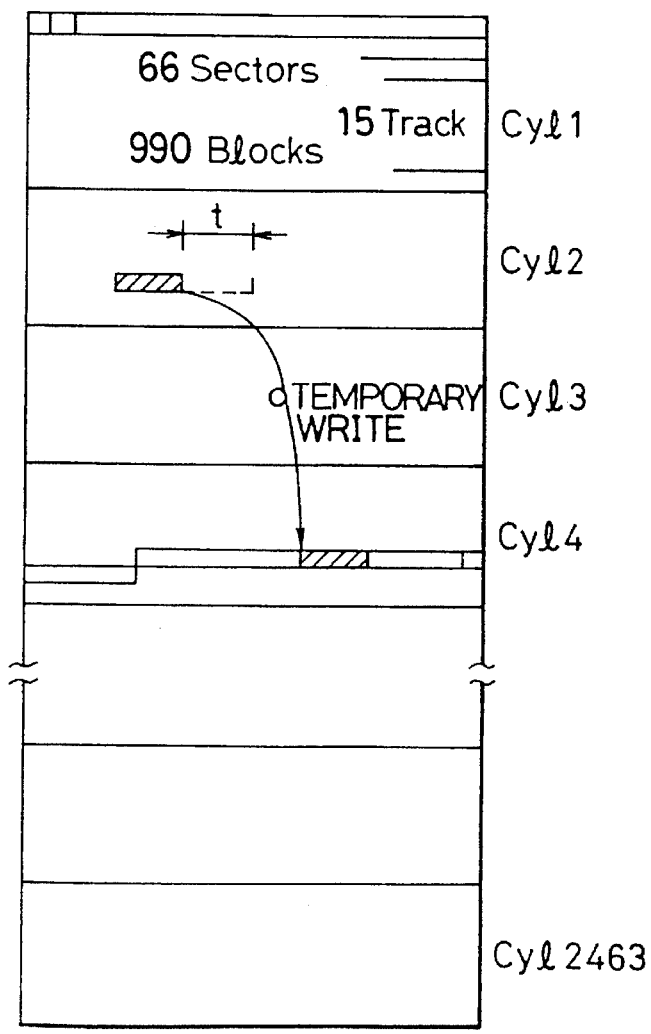

FIG. 10

| | #0 | #1 | #2 | #3 | #P |
|---|---|---|---|---|---|
| GROUP 0 (UPDATING NO PARITY) | 0 | 1 | 2 | 3 | P |
| GROUP 1 (UPDATING PARITY) | 4 | 5 | 6 | 7 | P |
| GROUP 2 (UPDATING PARITY) | 8 | 9 | 10 | 11 | P |
| GROUP 3 (UPDATING NO PARITY) | 12 | 13 | 14 | 15 | P |
| GROUP 4 | 16 | 17 | 18 | 19 | P |
| | | | | | |
| GROUP Z | | | | | |

FIG. II

PARITY UPDATE INFORMATION TABLE

| PRE-UPDATE PARITY GROUP | TIME | FLAG |
|---|---|---|
| GROUP 0 | 0.00ms | 0 |
| GROUP 3 | 0.75ms | 0 |
| - | | - |
| - | | - |
| - | | - |

0 PRE-UPDATE
1 HAVING BEEN UPDATED

FIG. 13

PARITY UPDATE INFORMATION TABLE

|  | FLAG |
|---|---|
| GROUP 0 | 0 |
| GROUP 1 | 1 |
| GROUP 2 | 1 |
| GROUP 3 | 0 |
| GROUP 4 | 1 |
| . | . |
| . | . |
| GROUP Z | 1 |

FIG. 17

|  | #0 | #1 | #2 | #3 | #4 |
|---|---|---|---|---|---|
| GROUP 0 (WRITE LATER) | 0 | 1 | 2 | 3 | P |
| GROUP 1 (WRITE) | 5 | 6 | 7 | P | 4 |
| GROUP 2 (WRITE) | 10 | 11 | P | 8 | 9 |
| GROUP 3 (WRITE LATER) | 15 | P | 12 | 13 | 14 |

FIG. 18

PARITY UPDATE INFORMATION TABLE

| LOGICAL ADDRESS | GROUP NO. | FLAG | | | | | TIME |
|---|---|---|---|---|---|---|---|
| | | #0 | #1 | #2 | #3 | #4 | |
| 3 | GROUP 0 | 0 | 0 | 0 | 1 | P | 0.00 ms |
| 12, 13 | GROUP 3 | 0 | P | 1 | 1 | 0 | 0.75 ms |

FIG. 23

① It stands for the original address. The number of addresses is as many as blocks.

② It stands for the area where practical data are written, for each block address of ①.

③ It indicates if the block shown in ① is used for storing data or not. "1" stands for being in use.

④ It indicates if data of the block of ① (original area) are all 00 or not. "0" stands for all 00.

| BLOCK ADDRESS | ② WRITING AREA BIT | | ③ IN-USE FLAG | ④ 0 FLAG | |
|---|---|---|---|---|---|
| 00 | 0→0 | 0→1 | 0 | 0 | ⎫ |
| 01 | 0→0 | 0→1 | 1→0 | 1 | ⎪ |
| 02 | 0 | 0 | 1 | 1 | ⎬ AREA 0 |
| 03 | 0 | 0 | 0 | 0 | ⎪ |
| 04 | 0 | 0 | 0 | 0 | ⎭ |
| . | | | | | |
| 18 | 0 | 0 | 1 | 1 | ⎫ |
| 19 | 0 | 0 | 1 | 1 | ⎪ |
| 20 | 0 | 1 | 0→1 | 0→1 | ⎪ |
| 21 | 0 | 1 | 0→1 | 0→1 | ⎬ AREA 1 |
| 22 | 0 | 1 | 0 | 0 | ⎪ |
| 23 | 0 | 1 | 0 | 0 | ⎪ |
| 24 | 0 | 1 | 0 | 0 | ⎭ |
| . | | | | | |
| 38 | 0 | 1 | 0 | 0 | ⎫ |
| 39 | 0 | 1 | 0 | 0 | ⎪ |
| 40 | 1 | 0 | 0 | 0 | ⎬ AREA 2 |
| 41 | 1 | 0 | 0 | 0 | ⎪ |
| 42 | 1 | 0 | 0 | 0 | ⎭ |

BLOCK ADDRESS CONTROL TABLE
(case of the number of areas being four)

FIG. 25

|  | #0 | #1 | #2 | #3 | #4 | |
|---|---|---|---|---|---|---|
| GROUP 0 | | | | | P | ⎫ WRITE AREA |
| GROUP 1 | /////// | /////// | | //P//// | /////// | |
| GROUP 2 | | | P | | | |
| | ⋮ | ⋮ | ⋮ | ⋮ | ⋮ | |
| AREA 1 | /////// | /////// | "0 0" | //P//// | /////// | ⎫ TEMPORARY WRITE AREA |
| AREA 2 | "0 0" | "0 0" | "0 0" | "0 0" | "0 0" | |
| AREA 3 | "0 0" | "0 0" | "0 0" | "0 0" | "0 0" | |
| | "0 0" | "0 0" | "0 0" | "0 0" | "0 0" | |

FIG. 26

TEMPORARY WRITE INFORMATION TABLE

|  | FLAG | DATA ADDRESS |
|---|---|---|
| AREA 1 | 1 | GROUP 1 |
| AREA 2 | 0 | 0 |
| AREA 3 | 0 | 0 |
| ⋮ | ⋮ | ⋮ |

FIG. 27

TEMPORARY WRITE INFORMATION TABLE

|  | FLAG | DATA ADDRESS FOR RE-WRITING | TIME |
|---|---|---|---|
| AREA 1 | 1 | GROUP 1 | 0.00ms |
| AREA 2 | 0 | 0 | 0.25ms |
| AREA 3 | 0 | 0 | 0.50ms |
| AREA 4 | 0 | 0 | 0.75ms |
| ⋮ | ⋮ | ⋮ | ⋮ |

Data of one disk are parity for the other four disks. Parity is calculated by XOR. (Exclusive OR: $\oplus$ stands for that.)

$D(0) = D(1) \oplus D(2) \oplus D(3) \oplus D(P)$
$D(1) = D(0) \oplus D(2) \oplus D(3) \oplus D(P)$
$D(2) = D(0) \oplus D(1) \oplus D(3) \oplus D(P)$
$D(3) = D(0) \oplus D(1) \oplus D(2) \oplus D(P)$
$D(P) = D(0) \oplus D(1) \oplus D(2) \oplus D(3)$

TABLE (MEMORY) AMOUNT

50000h × 4 Byte = 20 MB

RECORDING APPARATUS AND METHOD FOR AN ARRAYED RECORDING APPARATUS

BACKGROUND OF THE INVENTION

1. Field of the Invention

The present invention relates to an arrayed recording apparatus which is a memory system of a computer. More particularly, it relates to an improvement of the efficiency and the reliability of a disk drive system comprising arrayed disk drives.

2. Description of the Related Art

Various papers and patents concerning a disk system comprising arrayed disk drives have been published. In this literature there is a paper from University of California at Berkeley concerning a system that dramatically improves the reliability of a large amount of stored data: "A Case for Redundant Arrays of Inexpensive Disks (RAID)", Proc, ACM SIGMOD Conf., Chicago, Ill., June 1988. This paper classifies the system for improving data reliability into five levels, from the conventional mirrored-disk system to the block-interleaved-parity system. Summaries of them are as follows.

RAID level 1

This is the normal mirrored (shadowed) system, in which the same data are stored in two groups of disk drives. Systems at RAID level 1 have been conventionally used in the systems which require high reliability. However, their cost per unit of capacity is high because of the great redundancy.

RAID level 2

Data are bit-interleaved in data disks of redundant groups, using a Hamming code in DRAM. ECC codes are written in a plurality of check disks per group to be able to correct a bit error. A group comprises about 10 to 25 data disks; for example, four check disks are needed for ten data disks. The redundancy is large to some extent.

RAID level 3

Data are byte-interleaved into a data disk of the group, using a specific parity disk. Only one parity disk is needed since positions of errors are detected from ECC at each drive. This level is suitable for a synchronous rotating of a spindle to transfer data at high speed.

RAID level 4

Data are block-interleaved into a data disk of the group, using a specific parity disk. This level is suitable when there are frequent access to a small amount of data since the block is used as an interleaving unit for data storing, which differs from the level 3.

RAID level 5

Having no specific parity disk, which differs from the level 3 and 4, the parity data are distributed and stored evenly in all disks (striping). Accordingly, at the writing time data accesses are not concentrated on a single parity disk drive, so that IOPS is increased. (This level is more effective than the level 4 when the ratio of writing is high.) Both the high processing performance and the improved memory efficiency provided by this level are good.

"Arrayed recording apparatus system and method" by Array Technology Corporation in U.S.A., disclosed in the Unexamined Japanese Patent Publication No. 2-236714 is known as an example of a conventional redundant arrayed recording apparatus. In this Array Technology Corporation case, It is possible to select the redundancy level and the logical number of disks in the disk drive configuration recognized and accessed by the host computer.

The system of distributing and storing the parity data evenly in all disks (striping) is disclosed in the Unexamined Japanese Patent Publication No. 62-293355, "Data Protection System" by International Business Machines Corporation in U.S.A..

FIG. 31 shows a configuration of the conventional arrayed recording apparatus disclosed in the Unexamined Japanese Patent Publication No. 2-236714. FIG. 31 is composed of the following. A host Interface 2 (called a host I/F, hereinafter) is a buffer between a host computer 1 and an array controller 13. A microprocessor 3 controls the array controller. An EOR engine 5 generates redundant data and recovers data. A data bus 6 interconnects the host I/F 2, the microprocessor 3, a memory 4 and the EOR engine 5. ACE panel 7 and plural channel controllers $8a \ldots 8e$ are also connected to the data bus 6. The array controller controls a plurality of disk drives $9a, \ldots, 9e$. The disk drives $9a, \ldots, 9e$ are connected to the channel controllers $8a, \ldots, 8e$ through a channel 10.

FIG. 32 explains a generation of the redundant data in a RAID. As shown in the figure, data of one disk out of five disks stores the redundant data (parity) of the other four disks. The parity can be obtained by calculating the exclusive OR (XOR) of the data of the four disks. That is, parity data of the parity disk P is obtained from the data of a disk 0, a disk 1, a disk 2 and a disk 3 by calculating their XOR. It is possible to recover data by having such a parity as the redundant data. For instance, when the data of the disk 0 can not be read out because of some obstacle, the data of the disk 0 can be recovered by using the data obtained from calculating the exclusive OR (XOR) of data of the disks 1, 2, 3 and the parity disk P.

In addition to the above method of calculating the parity by calculating XOR of the data of the four disks, there is another method as follows. By reading old data of the disk where data will be written and current parity data stored in the parity disk, then calculating the XOR of the new data, the old data and the current parity data, new parity data can be obtained. This method will be described with respect to FIG. 33. For instance, in the case of new data DN(2) being written into the disk 2, old data is read from the disk 2 as data DO(2) first. Simultaneously, current parity data DO(P) are read from the parity disk. Then, new parity data DN(P) are obtained by calculating XOR of the three data DN(2), DO(2), DO(P). The new data DN(2) are stored in the disk 2. Finally, the new parity data DN(P) are stored in the parity disk.

The operation of the system shown in FIG. 31 will be described. In FIG. 31, all of storing requests and recovering requests for data from the host computer 1 are carried out through the host I/F 2. When data are stored, commands and data from the host computer 1 are temporarily stored in the memory 4 via the data bus 6. When data are recovered, data stored in the memory 4 are sent to the host computer I through the host I/F 2.

Operation at RAID level 5 will be described with respect to FIGS. 31 and 34. When data are stored, the microprocessor 3 divides data stored in the memory 4 into data blocks, and determines disk drives in which the data will be written and in which redundant data will be written. At RAID level 5, the old data from the data blocks to be written are necessary for updating the redundant data, so a read operation is carried out before the write. Data are transferred between the memory 4 and channel controller 8 on the data bus 6, and redundant data are generated by the EOR engine 5 in synchronization with this data transfer.

As shown in FIG. 34, it is assumed that the data block is set at 512 bytes for example. Blocks which store the parity are distributed to each disk drive as shown P1, P2, P3, . . . Such recording state is called a striping. D11, D21, D31, D41 and P1 are called a redundant group. D12, D22, D32, P2 and D51 are also called a redundant group.

In writing of 1024 bytes of data, the data are divided and stored into two blocks D11 and D21. The parity data P1 are also stored. This process will be explained in order as follows. First, disk drives 9a and 9b in FIG. 31 are selected for writing the data, and disk drive 9e is selected for redundant data. The EOR engine 5 is started under control of the microprocessor 3, and the channel controllers 8a, 8b, and 8e connected to the data disk drives 9a and 9b and the redundant data disk drive 9e are commanded to read old data under control of the microprocessor 3, in order to calculate redundant data. After the reading of old data from the above data disk drives 9a and 9b and redundant data disk drive 9e has been completed, the writing of new data in the data disk drives 9a and 9b and the writing of updated redundant data generated by the EOR engine 5 in the redundant data disk drive 9e are carried out at the direction of the microprocessor 3. As stated above, the process takes a long time because when data are written it is first necessary to read old data in order to generate redundant data.

Next the reading of data will be described. When the reading of data is requested by the host computer 1, the microprocessor 3 calculates the data blocks and data disk drives in which the data are stored. If the data are stored in a disk drive 9c, for example, a read command is issued to a channel controller 8c connected to the disk drive 9c. When the reading of data from the disk drive 9c has been completed, the data are transferred to the memory 4 and the host computer 1 is notified that the reading of data has been completed.

Data recovering and data reproduction onto the standby disk when a malfunction occurs will be described. Data recovering is carried out when it has become impossible to read data from the disk drive 9c, for example. When it is impossible to read data from the disk drive 9c, data reading from all the disk drives of the redundant group including data block concerned for reading, is carried out by the microprocessor 3 and data of the data block where no data could be read out is recovered by the EOR engine 5.

For example, when the redundant group is composed of the disk drives 9a, 9b, 9c, 9d and 9e, data block is read out from the disk drives, 9a, 9b, 9d and 9e. Then, data of the disk drive 9c is recovered by the EOR engine 5, the data are transferred to the memory 4, then the host computer 1 is notified that reading data has been completed.

As stated above, it is possible to recover data even when reading has become impossible because of a malfunction in the disk drive. Accordingly, the reliability of data is improved.

PROBLEMS TO BE SOLVED BY THE INVENTION

Since the conventional arrayed recording apparatus is constructed as described above, one problem has been that even in normal operation, processing takes time because, when data are written, it is first necessary to read data to generate the new redundant data.

Some techniques are already suggested to solve the above problem. FIG. 35 shows a configuration of a "disk drive sub system" disclosed in the Unexamined Japanese Patent Publication No. 4-245352. When a control device receives a write command from a processing device, the "disk drive sub system" identifies an existence of necessary information in a cache, for producing an update value of a parity record. When the control device receives write data from the processing device, the control device notifies the processing device that the write command has been completed. Without being synchronized with the write command from the processing device, the control device loads the necessary information, which is not in the cache, for producing the update value of a parity record, and determines and writes the update value of the parity record. By the operation above stated, tile processing for the write request is performed at high speed in an arrayed disk system which allocates data in the record unit. In this "disk drive sub system", the production of update value for the parity record is not synchronized with the write request from the processing device to the control device, and the writing process can be also performed without being synchronized with the write request. However, though the updating of the parity record is performed without being synchronized, the processing time necessary for updating the parity record by the control device itself has not been improved.

FIG. 36 shows a visualized diagram of a data storing method of the arrayed disk system disclosed in the Unexamined Japanese Patent Publication No. 4-127224. When data stored in a buffer as data to be rewritten are stored in the disk drive, the data are not rewritten into the area where the data are stored originally, but written into another area which is not in use. Though a concrete means is not described in the above publication, it can be assumed that data to be stored are not rewritten into the area where the data are stored originally, but written into another area which is not used, by the method shown in FIG. 36. It is premised that one block is 1 KB and data amount (excluding the amount for the parity) for one disk is 1 GB. The number of blocks per one disk is 1M, so that the number of the total blocks is 5M when there are five disks in the arrayed disk drive. Assuming that any mapping change is allowed within the data blocks of 5M and data can be written in an optional area which is not used, a table shown in FIG. 36 is needed. Block addresses from 0 to 4FFFFF are shown in FIG. 36, 5M addresses can be designated totally. Block address (23 bits) for actual writing in the case of data being written into another area which is not used, an in-use flag (1 bit) which shows whether or not data are already written in the block address, and a 0 (zero) flag (1 bit) which shows whether or not the block address is initialized using 00 (null code) are provided in the table for each of the 5M block addresses. The block addresses for actual writing need to be at least 23 bits to identify one of 5M. In addition, since 1 bit for the in-use flag and 1 bit for 0 flag are needed, a total memory area of 25 bits is needed. The memory area needs 4 Bytes including spare bits. Therefore, the memory amount of the table is 50000h×4 Bytes=20 MB. Accordingly, memory amount of 20 MB is needed when any mapping change of data blocks of 5M is allowed. Providing the memory amount of 20 MB in the cache memory or in the memory in the control device in advance makes the hardware construction large, so that costs are high.

An object of the present invention is to obtain an arrayed recording apparatus, a recording apparatus and a recording method whose processing time for data writing is improved in order to solve the above mentioned problems.

Another object of the present invention is to obtain an arrayed recording apparatus, a recording apparatus and a recording method for performing the writing process at high speed.

SUMMARY OF THE INVENTION

According to one aspect of the present invention of an arrayed recording apparatus, a temporary write area corresponding to a specific write area in a recording device is provided in the recording device and an array controller comprises a temporary write means, a memory means, and a re-write means. When data are written into the write area, the temporary write means writes data into the temporary write area corresponding to the write area to be written. The memory means stores location information on the write area to be written originally, corresponding to the data stored in the temporary write area by the temporary write means. A re-write means rewrites data written in the temporary write area, into the write area based on location information of the write area stored by the memory means.

According to another aspect of the present invention of the arrayed recording apparatus, a position detect means which detects a rotational position of the recording device is included. When a temporary writing is needed, the temporary write means writes data into an open area of the temporary write area based on the rotational position of the temporary write area detected by the position detect means.

According to another aspect of the present invention of the arrayed recording apparatus, a memory means stores location information on the area where data are written by the temporary write means, in a memory. The re-write means starts a rewriting operation based on the location information written in the memory by the memory means and the position information detected by the position detect means.

According to another aspect of the present invention of the arrayed recording apparatus, the temporary write means writes a block corresponding to updated redundant data, in the temporary write area when updated redundant data read from the data in the write area are written. The re-write means writes the block in the temporary write area, into the write area.

According to another aspect of the present invention of the arrayed disk drive device, an initialize means which initializes the temporary write area is included. The temporary write means writes data to be written in the write area, into the temporary write area initialized by the initialize means, without reading data in the write area. The re-write means calculates redundant data and writes the calculated redundant data into the write area based on the data in the temporary write area and the data in the write area.

According to another aspect of the present invention of the arrayed recording apparatus, at least one of plural recording devices is defined as a redundant device for storing redundant data. An array controller comprises a temporary write means, a memory means and a re-write means. The temporary write means writes data into the recording device without calculating the redundant data when data are written in the recording device. The memory means stores location information of data written by the temporary means, into a memory. The re-write means reads data based on the location information stored by the memory means, calculates the redundant data based on the read out data and writes the calculated redundant data into the redundant device.

According to another aspect of the present invention of the arrayed recording apparatus, a synchronization control means shifts the rotational phase of the recording devices excluding the redundant device, from the rotational phase of the redundant device. The re-write means calculates redundant data during the time difference between the rotational phases of the recording device and the redundant device.

According to another aspect of the present invention of the arrayed recording apparatus, a cache memory which stores accessed data temporarily is implemented in the recording device. A temporary write means writes data into the recording device without calculating redundant data when data are written in the recording device. A memory means stores location information of data written by the temporary write means, in tile memory. A re-write means generates a prefetch command of data needed for calculating redundant data to the cache memory of the recording device in which data is not written by the temporary write means, reads data based on the location information of the data written by the memory means when the prefetch has been finished, calculates redundant data from the read out data, and writes the calculated redundant data into the redundant device.

According to another aspect of the present invention of the arrayed recording apparatus, a position detect means detects a rotational position of the recording device. The re-write means starts the rewriting operation based on tile location information of the redundant device detected by the position detect means.

According to another aspect of the present invention of the arrayed recording apparatus, a synchronization control means shifts rotational phase of the recording device excluding a recovering device from the rotational phase of the recovering device when there is the recovering device for recovering data in the plurality of recording devices. A re-write means reads data from the recording device, calculates a recovering data from data read out from the recording device during the time difference between the rotational phases of the recording device and the recovering device, and writes the recovering data into the recovering device.

According to another aspect of the present invention of the arrayed recording apparatus, a position detect means detects a rotational position of the recovering device. The re-write means starts the operation of rewriting based on tile rotational position detected by the position detect means.

According to another aspect of the present invention of the arrayed recording apparatus, a command stack means stacks commands to access the data of the recording device and processes the stacked commands in the specific order. The re-write means generates a command to rewrite data and outputs it to the command stack means.

According to another aspect of the present invention of the arrayed recording apparatus, the re-write means lowers the priority of processing of a command to rewrite data and outputs it to the command stack means.

According to another aspect of the present invention of the arrayed recording apparatus, an initialize means divides the write area of the recording device into a plurality of divided areas having a specific size and initializes each divided area. A memory stores information on initialization and on divided area per block. The information on initializing shows whether the block has been initialized by the initialize means or not. The information on divided area shows the divided area where the written block exists when data are temporarily written into the block in another divided area. A write means refers to the initializing information for each block written in the memory when data are written into the block of a group, and writes data into the block of the group concerned when all the blocks of the group are in an initial state. When all the blocks of the group are not in initial state, the write means refers the initializing information of a block of each group in another divided area stored by the memory. Then, the write means detects a group whose blocks are all in initial state, and writes data into it. A memory update means updates the initializing information of the block where the data are written by the write means and stores information on divided area which designates a divided area where the block data written exists.

According to another aspect of the present invention of the arrayed recording apparatus, the memory stores data on use state which shows whether each block is in use or not. The initialize means initializes a block whose use state in tile memory is not in use. The memory update means updates initializing information on the block which has been initialized by the initialize means.

According to another aspect of the present invention of the arrayed recording apparatus, it is a feature that a non-volatile memory is used as the memory.

According to another aspect of the present invention of the arrayed recording apparatus, a cache memory stores data read out from tile recording device. An interface means inputs and outputs data in a first size unit from and to the host machine using the cache memory. Depending upon the write command of data of the first size unit which was input from the host machine by the interface means, a compare means compares data in the first size unit according to the write command with data stored in the cache memory, per a second size unit. Based on the result of the comparing, an update means updates data of the recording device per the second size unit.

According to another aspect of the present invention of the arrayed recording apparatus, plural recording devices are provided. The second size unit is an access unit used for accessing each recording device. Based on the comparing result, the compare means Judges whether it is necessary or not to update data at each recording device.

According to another aspect of the present invention of the arrayed recording apparatus, a recording device control means which is corresponding to each recording device is included. The cache memory, the compare means and the update means are provided in each recording device control means. The interface means divides data in the first size unit into pieces of data in the second size unit and distributes each datum to the cache memory provided in each recording device control means.

According to one aspect of the present invention, a recording method for operating an arrayed recording apparatus comprises the steps of:

(a) providing a temporary write area in each of the recording devices;

(b) temporarily writing data in the temporary write area instead of writing in the write area; and (c) re-writing data in the temporary write area into the write area.

According to another aspect of the present invention, the method for operating an arrayed recording apparatus further comprises the step of storing a location of data written in the temporary write area and a location of data to be written in the write area so that the re-writing step refers the locations to rewrite data.

According to another aspect of the present invention, the operating method further comprises the step of detecting a rotational position of the recording device, wherein the temporarily writing step starts the writing based on the rotational position detected by the detecting step.

According to another aspect of the present invention, the operating method further comprises the step of detecting a rotational position of the recording device, wherein the re-writing step starts the rewriting based on the rotational position detected by the detecting step.

According to one aspect of tile present invention, a recording method for an arrayed recording apparatus comprises the steps of:

(a) providing a redundant device;

(b) temporarily writing data in the recording devices without calculating a redundant data;

(c) storing a location of data written by the temporarily writing step;

(d) reading data from the location stored by the storing step;

(e) calculating the redundant data based on data read by the reading step; and (f) re-writing the redundant data calculated by the calculating step to the redundant device.

According to another aspect of the present invention, the recording method further comprises the step of controlling a synchronization of the rotation for delaying a rotational phase of the redundant device from that of the recording devices, wherein the calculating step calculates the redundant data in the delayed period.

According to one aspect of the present invention, a recording method for an arrayed recording apparatus comprises the steps of:

(a) providing cache memories in the plurality of the recording devices respectively;

(b) temporarily writing data through the cache memories into the specified recording devices without calculating a redundant data;

(c) prefetching data needed for calculating the redundant data into the cache memories from the recording devices which are not specified for writing data by the temporarily writing step;

(d) calculating the redundant data according to the data in the cache memories; and (e) re-writing the redundant data to one of the recording devices.

According to one aspect of the present invention, a recording method for an arrayed recording apparatus comprises the steps of:

(a) dividing the write area into a plurality of divided areas so as to provided corresponding redundant groups among the divided areas;

(b) initializing the divided areas;

(c) searching an initialized redundant group among the corresponding groups in the divided areas if original redundant group to write data Is not initialized group;

(d) writing data in tile initialized redundant group found by the searching step; and (e) storing the divided area where data are written by the writing step in the original redundant group.

According to one aspect of tile present invention, a recording method for recording apparatus comprises the steps of:

(a) reading data In the second size unit for plurality of times into the buffer from the recording device;

(b) transferring data in the first size unit;

(c) receiving updated data in the first size unit from the machine;

(d) comparing updated data and data in the buffer per the second size unit; and (e) updating data per the second size unit in the recording drive if the comparing result per the second size unit by the comparing step shows a difference.

BRIEF EXPLANATION OF THE DRAWINGS

FIG. 2 shows a configuration of a recording device of FIG. 1.

FIG. 4 illustrates a temporary write information table according to said first embodiment of the present invention.

FIG. 7 shows a configuration of a recording device of FIG. 1 according to a third embodiment of the present invention.

FIG. 10 illustrates operation of Embodiment 6.

FIG. 11 illustrates a parity update information table of Embodiment 6.

FIG. 13 illustrates a parity update information table according to a seventh embodiment of the present invention.

FIG. 17 illustrates operation of Embodiment 9.

FIG. 18 illustrates a parity update information table of Embodiment 9.

FIG. 23 illustrates block address control table of Embodiment 11.

FIG. 25 illustrates operation of Embodiment 12.

FIG. 26 shows a temporary write information table of Embodiment 12.

FIG. 27 shows a temporary write information table of Embodiment 13.

DESCRIPTION OF THE PREFERRED EMBODIMENTS Embodiment 1.

Figure 1:
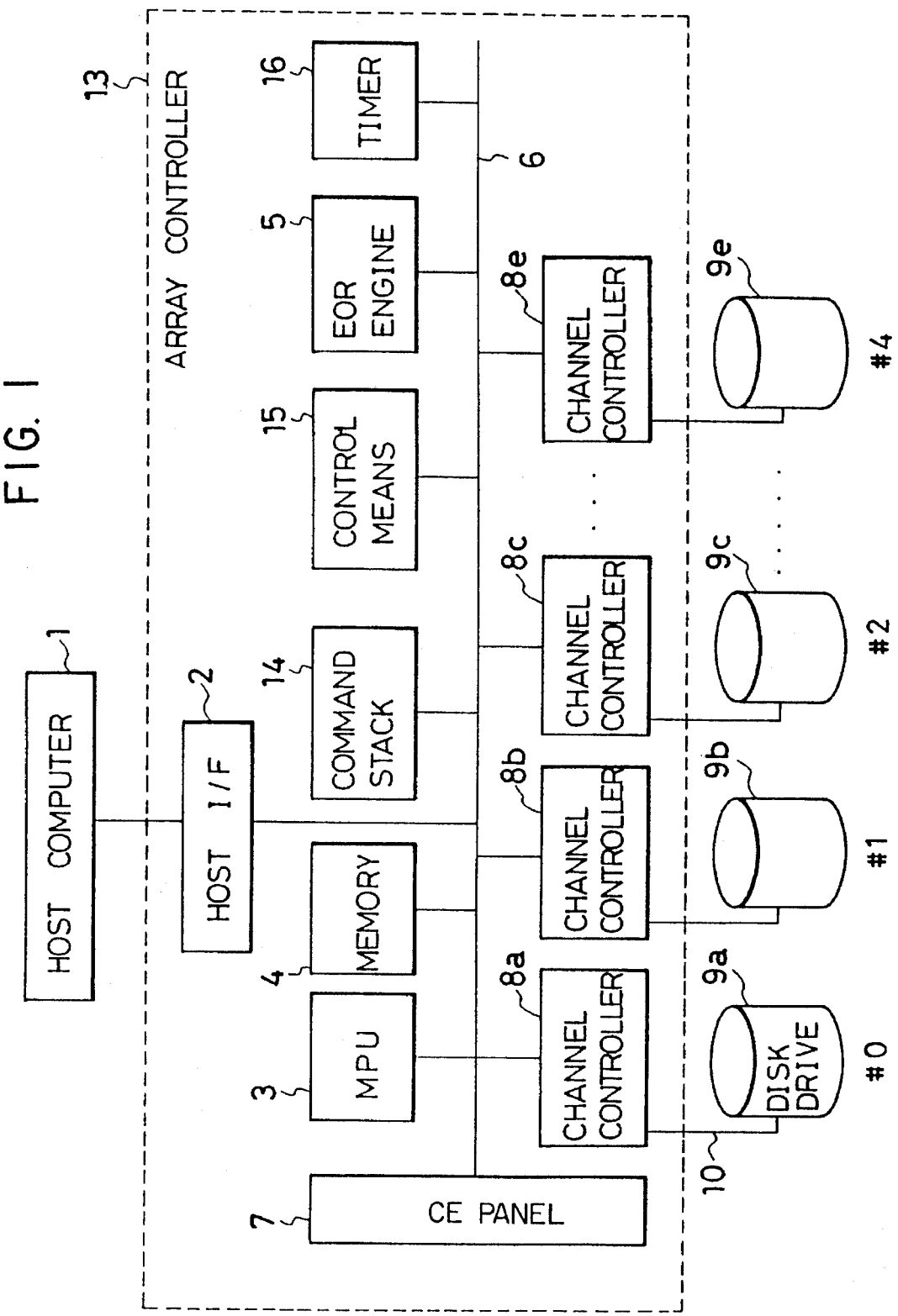
FIG. 1 shows a configuration of an arrayed recording apparatus according to a first embodiment of the present invention.

FIG. 1 shows a first embodiment of the arrayed recording apparatus of the present invention. In FIG. 1, the same parts or the corresponding parts to the Related Art discussed previously have the same references and explanations about them are omitted here. In FIG. 1, a command stack 14 stacks a command from a host computer 1. A control means 15 controls the main operations of the embodiment. A timer 16 administrates a rotational position of the disk per disk drive. In this embodiment and the other embodiments stated later, one block is defined as one sector to simplify the explanation.

The configuration of a disk drive is presented with FIG. 2. In the example of FIG. 2, a temporary write track is provided for each cylinder. When a cylinder is composed of fifteen tracks, for example, the fifteenth track is used as the temporary write track and the other fourteen tracks are used as normal write tracks. Data of a read-modify-write are not written into the original sector which was read; rather, the data are temporarily written into the closest sector in the open area of the temporary write track.

When the read-modify-write is performed at the first sector of the first track of a cylinder 1 in FIG. 2, for instance, after the first sector being read and modified, the data are written into the third sector (927th sector from the top) of the fifteenth track. It is possible to write the modified data into the third sector in the case that redundant data can be calculated using the first sector during the time t1 from the finish of reading out at the first sector to the start of reading into the third sector.

For example, when the read-modify-write is performed at the data of the contiguous four sectors from the 1500th sector of the second cylinder, then if time t2 is needed for producing data to modify and write, it is possible to write the modified data into the open area of the temporary write track, for instance from the 1930th sector, after the time t2 has passed since the finish of the data reading.

Figure 3:
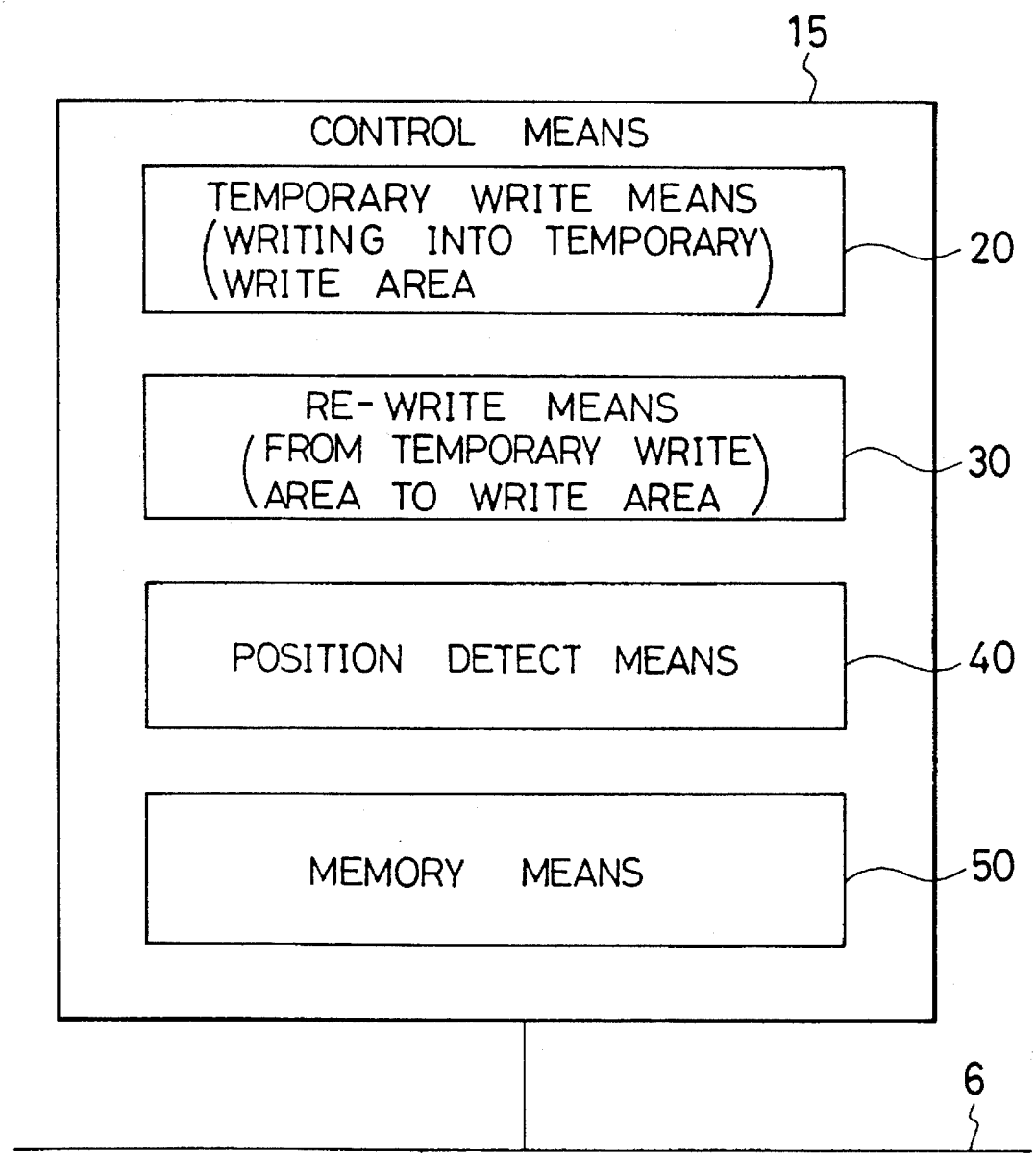
FIG. 3 shows a configuration of a control means of FIG. 1 according to a first embodiment of the present invention.

FIG. 3 shows a configuration of the control means 15 shown in FIG. 1. The control means 15 comprises a temporary write means 20, a re-write means 30, a position detect means 40 and a memory means 50. The temporary write means 20 writes data into a temporary write track or temporary write area as shown in FIG. 2. The re-write means 30 rewrites the data, which was written into the temporary write area by the temporary write means, into the original write area. The position detect means 40 detects a position of the sector in the track by using the timer 16. The memory means 50 stores a position of data written into the temporary write area by the temporary write means. The memory means 50 also stores a position of a write area in which the data should be written originally.

FIG. 4 shows an example of a temporary write information table stored in the memory means 50. As shown in the figure, the temporary write information table has tables for each disk drive. A write address to be written originally, a temporary write address and time measured by the timer 16 are stored in each table.

When data of the first sector is stored in the 927th sector as shown in FIG. 2, the temporary write address 927 is written correspondingly to the original write address 1 as shown in the first line of the table in FIG. 4. 0.75 ms is stored in the time section as a rotation time from the head position of the disk rotation to the third sector. (It is usually possible to detect the head position of the disk rotation by an index mark.)

Similarly, as shown in FIG. 2, when data of the 1500th sector is written in the 1930th sector temporarily, information corresponding to them is stored. Time from the head position of the disk rotation to the 1930th sector written in the temporary write address is stored as the rotation time.

Time for the disk rotating once is omitted by the temporary write means 20 because it is not needed to write data into the original write area in which data should be written originally. Since the temporary write means 20 writes data into the open area of the temporary write area, the temporary writing of the data finishes before the disk rotates once. If no data can be written temporarily since the temporary write area is already full, the data are written into the original write area as usual. Accordingly, no trouble takes place even when the temporary write area is full.

The memory means 50 stores temporary write information as shown in FIG. 4 when data are written temporarily by the temporary write means. The position detect means 40 is used for detecting a head position of an open sector when the temporary write means 20 writes data into the temporary write area. The position detect means 40 detects a rotating position of the disk and a sector position in which data can be stored by using the timer 16. The memory means 50 also stores time as the sector position detected by the position detect means 40.

The re-write means 30 rewrites data into the address where the data should be written originally by using the temporary write information table. The re-write means 30 first refers to the time in the temporary write information. Then, the re-write means 30 detects a current position of the rotating disk by the position detect means 40 and compares the time of the current position with tile time in the temporary write Information table. When data is read from the temporary write address 927 for instance, if the rotational position is within 0.75 ms of the index mark on the disk, a read command is generated. Accordingly, the waiting time for the data reading based on the read command becomes zero or close to zero, then the data are read out from the 927th sector. The re-write means rewrites the data, which is read from the temporary write area, into the position indicated by the write address of tile temporary write information table.

Figure 5:
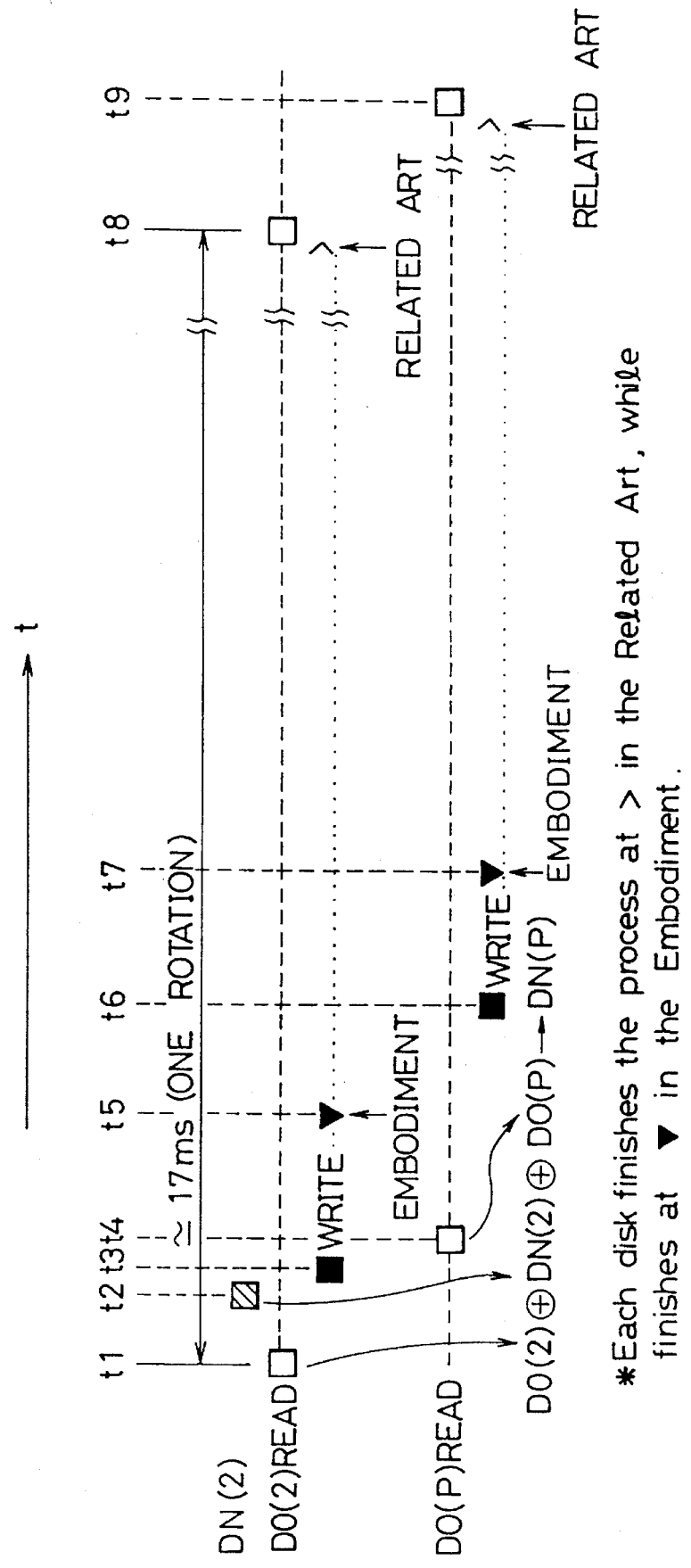
FIG. 5 shows a timing chart of the operation of said first embodiment of the present invention.

FIG. 5 is a time chart of the operation described above. FIG. 5 shows the time chart in the case of data of the disk #2 being read-modify-write. First, the current data DO(2) is read from the disk #2 at the time t1. Next, the read data are modified and set at the time t2 as data DN(2). Then, a write command is generated at the time t3. The modified data DN(2) are written in the temporary write area of the disk #2 at the time t5. In the conventional device, tile write command does not finish until time t8, because the disk must rotate once. But, the write command finishes at the time t5 in this case. Concerning the redundant data, the current redundant data DO(P) are read at tile time t4 and new redundant data DN(P) are generated during the time t4 and t6. The write command is generated at the time t6. After the write command is generated, the new redundant data DN(P) are written into the temporary write track of the disk #P, which finishes at the time t7. Since the conventional device must wait for the disk to rotate once to write the redundant data, the write command can not be finished until the time t9.

According to the arrayed recording apparatus of this embodiment, the temporary write area corresponds with the specific write area; for example, it corresponds with a cylinder. When performing a read-modify-write on data, the temporary write means 20 writes the data into the temporary write area, not into the area where the original data are stored. Accordingly, it is not necessary to wait for tile disk drive to rotate once to write data in tile coincident position when the disk drive is rotating. Since the temporary write means 20 writes data to be rewritten, in an open area of the temporary write area, it is not necessary to wait for the disk rotation, so that the data to be rewritten can be written into the temporary write area at once. The memory means 50 stores location information for rewriting the data written in the temporary area by the temporary write means. The re-write means 30 rewrites the data written in the temporary write area to tile original write area depending upon the location information stored in the memory means 50. It is not necessary for the operation of the re-write means 30 to be synchronized with the temporary write means 20. The operation of the re-write means 30 can be performed when the recording device is in an idle state.

According to the arrayed recording apparatus of this embodiment, the position detect means 40 which detects rotational position of the recording device can detect the rotational position of the temporary write area where data should be written by the temporary write means 20. The temporary write means 20 can finish the operation of the temporary writing fastest by writing data into the first open area in the temporary write area detected by the position detect means 40.

According to the arrayed recording apparatus of this embodiment, the memory means 50 stores location information detected by the position detect means 40 and the re-write means 30 starts operation Just before the position where the temporary write means wrote the data, based on the location information stored in the memory means 50. Namely, the re-write means 30 can finish the reading operation at once, since tile re-write means can start the operation at the time which is back as much as the time necessary for reading data from the temporary write area.

According to the arrayed recording apparatus of this embodiment, the temporary write means 20 reads all the data which are necessary for calculating redundant data and writes data to be stored and the calculated redundant data in the temporary write area. Therefore, the rewrite means 30 can finish the rewriting operation just by reading data out in the temporary write area and writing the data into the original write area.

According to the arrayed recording apparatus of this embodiment, a memory which has a backup battery or a non-volatilized memory like a flash memory is used for the memory of the memory means 50. Consequently, if a failure occurs in the disk drive when redundant data have not been calculated and written or when data have not been written into the area to be written originally, since the information has not been lost, it is possible to continue calculating data or rewriting data in the state of pre-failure, after the failure has been recovered, by referring the non-volatilized memory.

According to this embodiment, a throughput of the writing improves to the efficiency of an array without a parity, as stated above. In addition, the reliability of this apparatus is better than the arrayed recording apparatus without redundancy.

Embodiment 2

In a second embodiment, the command stack 14 shown in FIG. 1 is used and will be explained. The command stack 14 is a memory which stacks a plurality of accesses from the host computer 1. The command stack 14 can stack each access command based on the priority. Host I/F 2 stacks the access commands from the host computer in the command stack 14 including a medium priority or high priority. Additionally, the re-write means 30 in the control means 15 stacks commands including a low priority. The operation of the re-write means 30 rewriting data from tile temporary write area to the write area is explained with respect to the first embodiment. In this embodiment, tile re-write means does not rewrite directly but stacks the re-write command in the command stack 14. However, since the priority of this command is low, the re-write command from the re-write means 30 is not performed until no request from the host computer 1 needs operation of tile disk. The access command for the rewriting operation generated by the re-write means 30 is not a particular one, but just commands data transfer from the temporary write address to the write address in the temporary write information table, as shown in FIG. 4. A plurality of the access commands stacked in the command stack are performed based on the priority from high to low depending upon a MPU 3 and the standard of the program stored in a memory 4.

Figure 6:
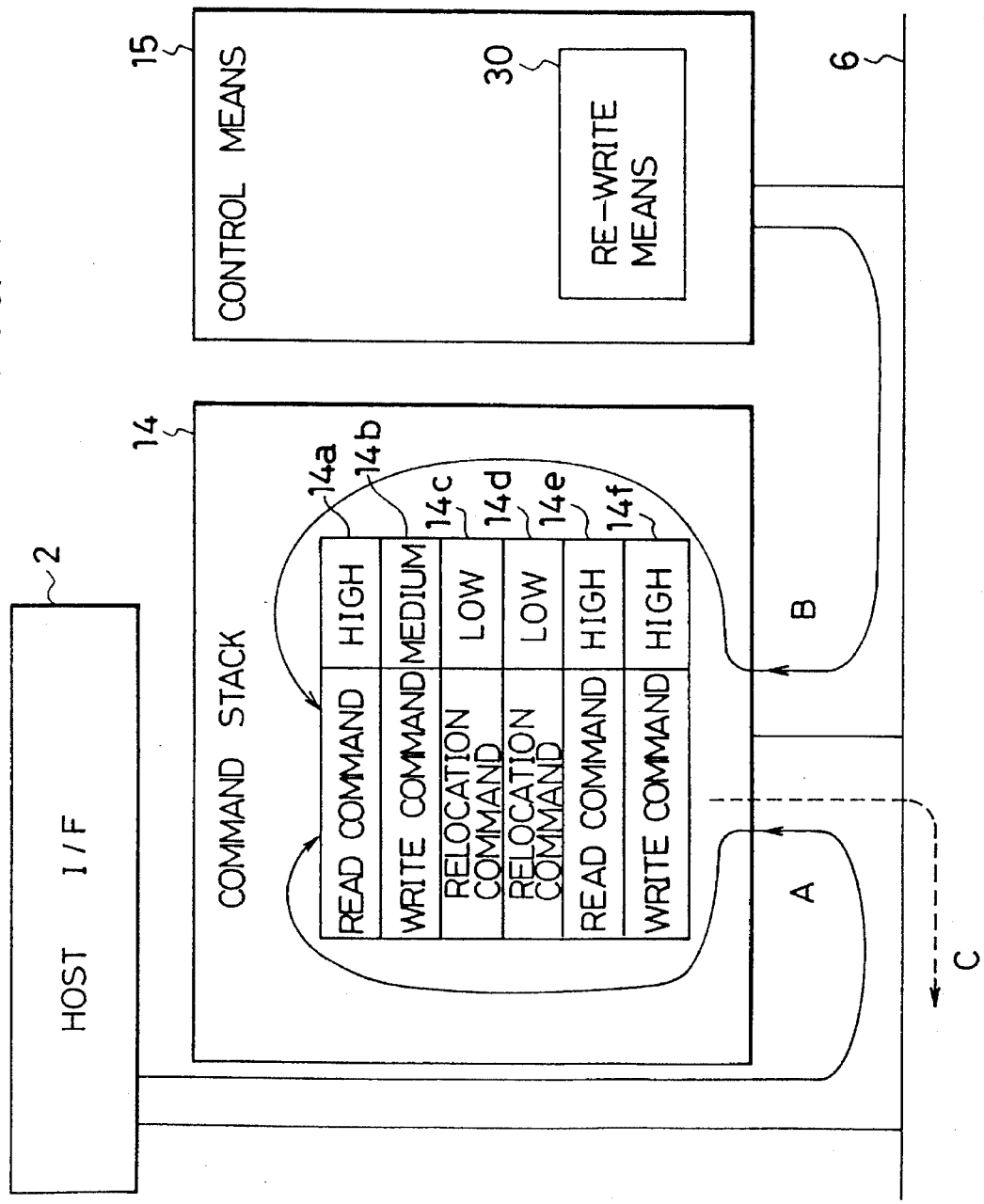
FIG. 6 shows a configuration of a command stack of FIG. 1 according to a second embodiment of the present invention.

FIG. 6 shows an example of this embodiment. Read commands and write commands from the host computer 1 are stacked in the command slack 14 through the host interface 2 as shown with arrow A. Relocation commands for rewriting data from the re-write means 30 in the control means 15 are stacked as shown with arrow B. The read commands and the write commands stacked from the host computer 1 are set at high priority or medium priority. On the other hand, the relocation commands stacked from the re-write means 30 are set at low priority. Commands in tile command stack are picked up by the MPU 3 based on tile program in the memory 4 depending upon the priority from high to low. The commands picked up are loaded to tile MPU along the arrow C and processed.

According to the arrayed recording apparatus of this embodiment, the array controller comprises the command stack which stacks commands from the processing device. The re-write means can finish the rewriting process by generating commands to rewrite data and to write calculated redundant data, and writing the generated commands into the command stack. Therefore, it is not necessary for the re-write means to perform the actual rewriting operation itself. The commands in the command stack are taken out depending upon a specific standard and carried out.

According to the arrayed recording apparatus of this embodiment, commands output from the re-write means to the command stack are set at low priority in processing. As the priority of the commands from the re-write means are lower than the priority of commands from the processing device, the rewriting operation can be performed when there is no access command from the processing device.

Embodiment 3

The previous embodiments have one temporary write track assigned at each cylinder. It is also acceptable to assign one temporary write track at every four cylinders as shown in FIG. 7. Also, one track is used as a temporary write area is explained in the above embodiments; it is also acceptable to use plural tracks as the temporary write area. The size of the write area and the temporary write area can be varied and their unit size can also be varied such as a sector unit, a track unit, a cylinder unit or a disk unit.

Embodiment 4

Although the case of the position detect means 40 detecting a position by using information on the rotational time from the index mark has been shown, another information on the position of the rotation can be used. For example, the position of the sector in the track detected by counting time using the timer 16 can be the substituted for the time in the temporary write information in FIG. 4. The position detect means can detect the position of the rotation by using another detecting method in addition to using the timer 16. For example, the position detect means generates a read command for a sector which is before the needed sector and receives a notice of the operation finish of the read command. The notice of the operation finish can be used to detect the current position of the rotation.

Embodiment 5

The case of the rotational position being detected by using the time stored in the temporary write information as the rotational position has been stated in the above embodiments. It is also acceptable to detect the time or the sector position from the temporary write address. For instance, it can be calculated that the 927th sector of the temporary write address is the third sector from the top sector, as shown in FIG. 2. Since one track is composed of sixty six sectors in the example of FIG. 2, the 927th sector can be calculated to be the third sector of the 15th track by using a formula of 927 =66×14+3. Similarly, it can be calculated that the 1930th sector is the 16th sector by 1930=66×29+16. In addition, time can be calculated by using the position of sectors. For instance, in the case of one rotation being 17 ms and one track being composed of 66 sectors, as shown in FIG. 2, the needed rotational time for about one sector can be calculated to be 0.25 ms (17 ms/66). Therefore, it can be calculated that the temporary write address is at 0.75 ms rotated from the index mark by 3× 0.25=0.75 since the 927th sector is the third sector from the top. Similarly, since the 1930th sector is the 16th sector from the top, it can be calculated that the 1930th is at 4 ms rotated from the index mark by using 16 ×0.25 ms=4.00 ms.

As stated above, the position detect means can detect the rotational position by time as shown in FIG. 4 or by the sector position. Furthermore, calculating the sector position according to addresses can be also used to detect the rotational position.

Embodiment 6

Figure 8:
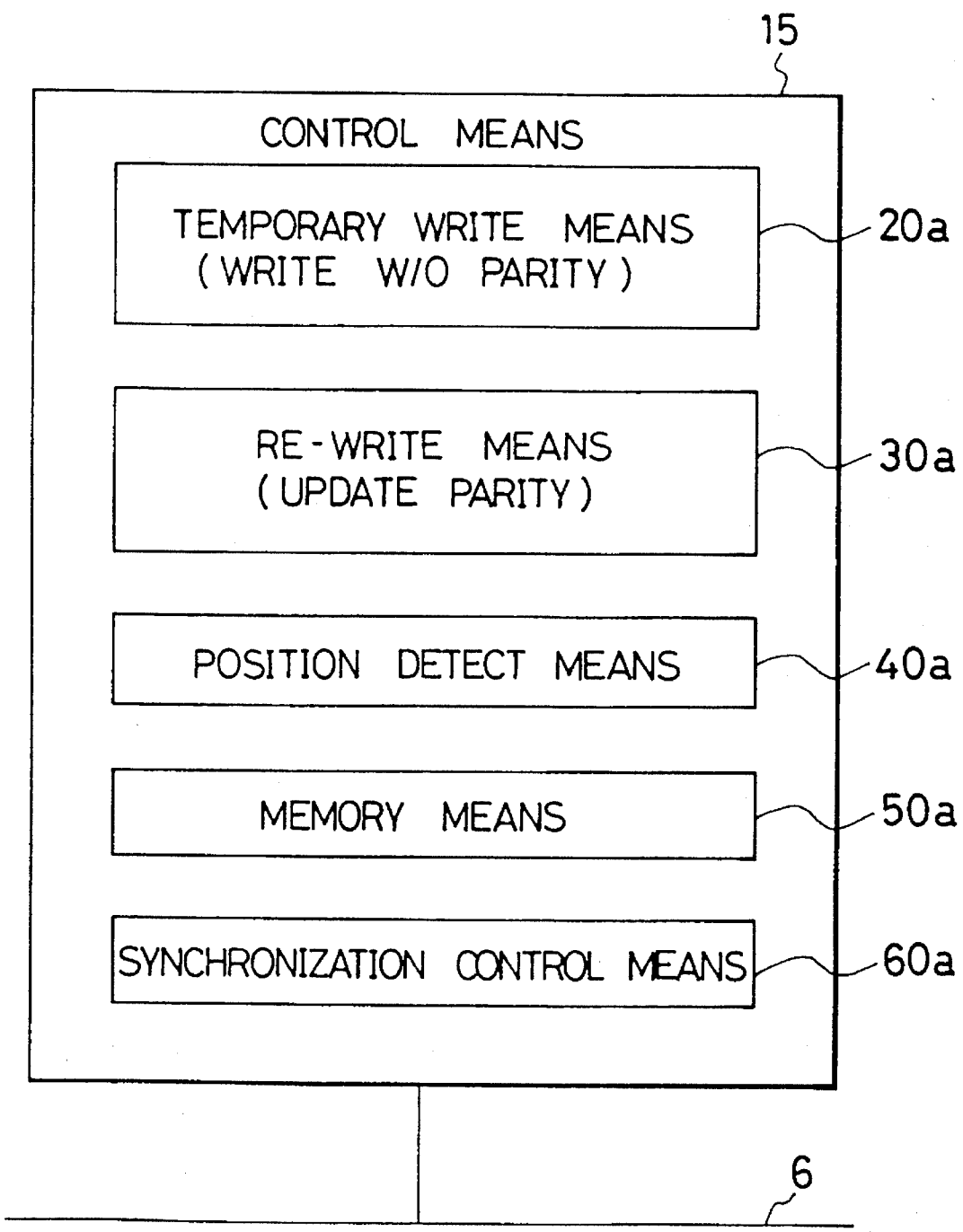
FIG. 8 shows a configuration of a control means of FIG. 1 according to a sixth embodiment of the present invention.

Another embodiment of the arrayed recording apparatus relating to the present invention will now be explained. FIG. 8 shows a configuration of the control means 15 of this embodiment. The whole configuration in this embodiment is the same as that of the arrayed recording apparatus shown in FIG. 1. However, the configuration of the control means 15 differs from that in FIG. 1. A temporary write means 20a temporarily writes data without calculating redundant data. A rewrite means 30a calculates redundant data based on the data written by the temporary write means 20a and updates the redundant data. A position detect means 40a detects a rotational position of the disk drive. A memory means 50a stores information of data written temporarily by the temporary write means. A synchronization control means 60a shifts a synchronization of a disk in which the redundant data should be written from the synchronization of other disk drives.

Figure 9:
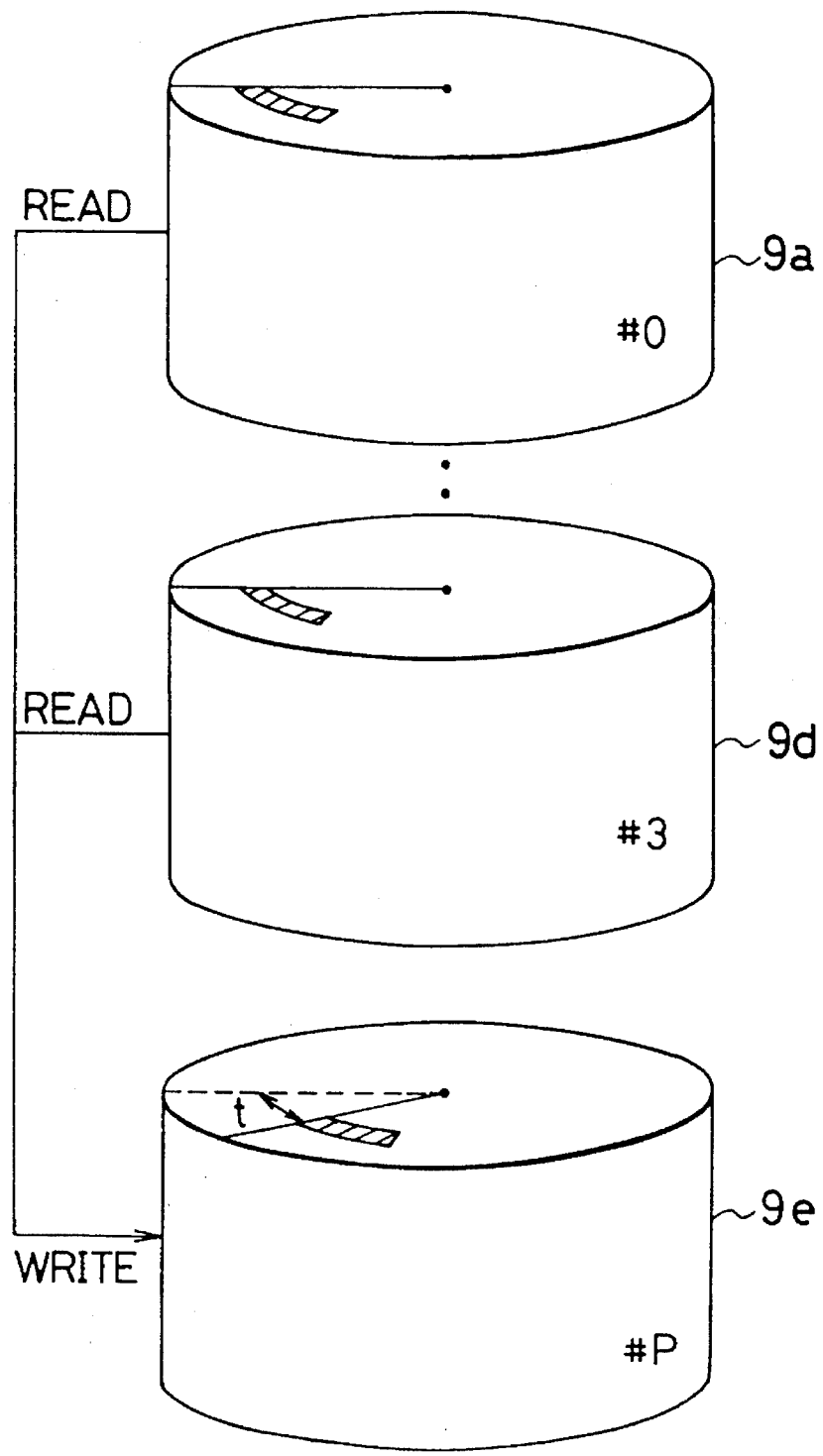
FIG. 9 shows a method of synchronization control of a synchronization control means of Embodiment 6.

FIG. 9 shows the operation of the synchronization control means 60a. The synchronization control means 60a shifts the synchronization of a redundant disk #P by time t against disks #0 to #3. In this embodiment, an exclusive disk for a parity is implemented and the rotation of the exclusive disk for the parity is behind the rotations of the other disks. The exclusive disk for the parity is several sectors behind the other disks in rotating.

FIG. 10 explains how data are updated when the synchronization control means 60a makes the synchronization of the exclusive disk for the parity several sectors behind the other disks in rotating. Groups in FIG. 10 stand for redundant groups. When all the data in four blocks in the redundant groups are updated simultaneously, the parity can be calculated from the data to be updated. Accordingly, the operation of reading old data from the disks is not necessary. Therefore, the parities are updated at the same time with writing data in the case of data writing in the group 1 and the group 2. On the other hand, the parities can not be calculated without reading the old data in advance in the case of the groups 0 and 3 since only a part of blocks is updated, which makes the operation slow.

In this embodiment, when the temporary write means 20a judges that only a part of blocks in the redundant groups is to be updated like the group 0 and the group 3, only the blocks concerned are updated and the parities are not updated at this time. The memory means 50a stores the redundant groups written by the temporary write means 20a without updating the parity.

FIG. 11 shows an example of a parity update information table stored in memory by the memory means 50a. As shown in FIG. 10, since the parities are not updated when data of the groups 1 and 3 are updated, the two groups are registered as pre-updated parity groups in the parity update information table.

The re-write means 30a checks flags in the parity update information table stored by the memory means 50a to find a pre-updated parity group. When the re-write means 30a detects a pre-updated parity group, the parity in the redundant group concerned is calculated and written into the exclusive disk for the parity. In the case of the parity being updated, the re-write means 30a changes the flag in the parity update information table to show the parity having been already updated. The information for the group whose parity has been updated in the parity update information table is deleted or overwritten by new data.

When the re-write means 30a updates the parity, it is necessary to read data ill each block of the redundant group. It is necessary to read data in the blocks 0, 2, 3 to update the parity of the group 0 in FIG. 10, for example. The timing of this reading is decided by the position detect means 40a. As stated in the foregoing embodiments, the position detect means detects the rotational position of the disk by several kinds of methods. The re-write means calculates the position of the group whose parity is needed to be updated by the time in the parity update information table shown in FIG. 11 and a read command is generated at just before the position of the group 0 comes for example.

Figure 12:
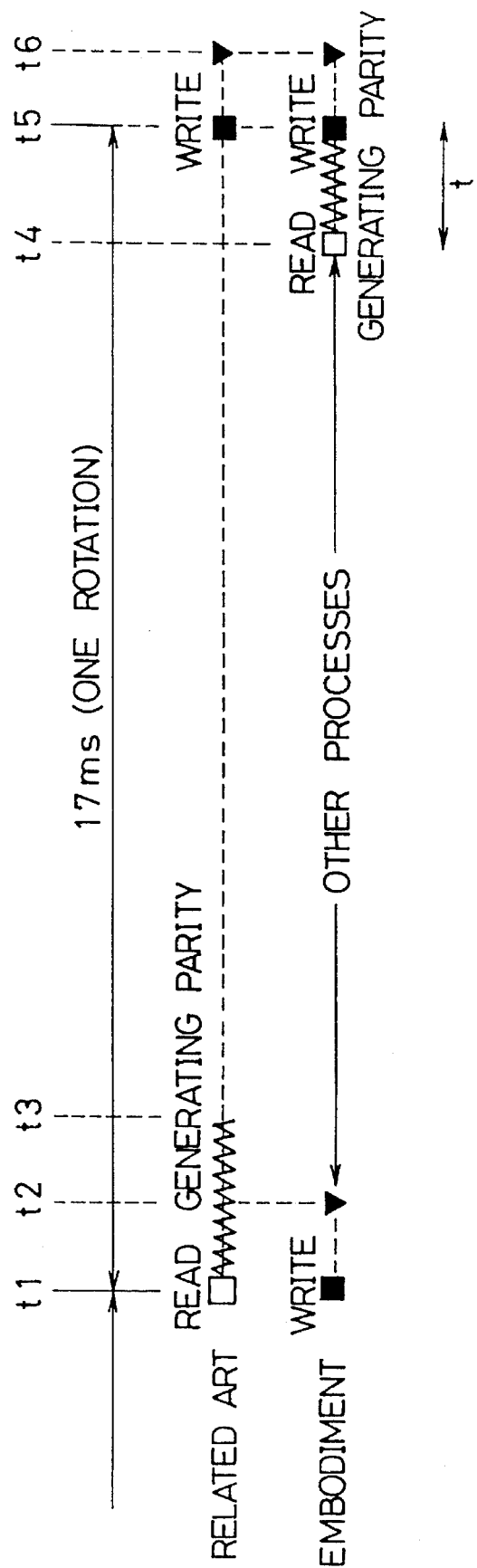
FIG. 12 shows a timing chart of the operation of Embodiment 6.

FIG. 12 is a timing chart of this embodiment. Conventionally, the read command is generated at the time t1 and the parity is generated from data already read and data to be written. Then, after the disk rotates once, that is at the time t5, the data are written. However, in this embodiment, the write command for the data to be written is generated at the time t1 and the writing finishes at t2. Therefore, it is possible to perform other processes at the time between t2 and t4. The rewrite means 30a generates the read command at the time t4 depending upon the time shown in FIG. 11 and upon the rotational position of the disk detected by the position detect means 40a. The parity is generated from the data read between the time t4 and t5 and the write command is generated at the time t5. Then the write command finishes by the time 6.

The time t between the time t4 and t5 shown in the timing chart corresponds to the time t which is shifted for the exclusive disk for the parity by the synchronization control means 60a shown in FIG. 9. Accordingly, it is suitable for the time t to be a period from the time of the read command being generated by the re-write means 30a to the time of the parity being calculated and the write command being generated. Time is used to indicate the position for detecting as shown in FIG. 11 in this embodiment. It is also acceptable to use the sector position as stated in the foregoing embodiment, or to calculate the sector position according to a number of the redundant group. The re-write means 30a can perform the operation of updating the parity directly, in addition, It is also acceptable to generate the rewrite command for reading the data in the redundant group, calculating the parity, and updating the parity, and output the command to the command stack 14.

According to the arrayed recording apparatus of this embodiment, one of recording devices is used as a redundant device for storing redundant data. When the temporary write means 20a writes data into the recording device, the temporary write means 20a writes the data into the recording device without calculating redundant data. The re-write means 30a reads data based on the location information of the data written by the temporary write means 20a stored in the memory means 50 and stores redundant data calculated from the data read out, into the redundant device. The operation of this re-write means 30a is not synchronized with that of the temporary write means 20a.

According to the arrayed recording apparatus of this embodiment, the rotational phase of the redundant device is shifted from the rotational phase of recording device excluding the redundant device. The re-write means calculates redundant data during the time difference between the rotational phases. Accordingly, it is enough for the time difference of the rotational phases between the redundant device and the recording device, to be the time which is necessary for the re-write means 30a to read data and calculate the redundant data. It has been necessary to wait for rotating once to write redundant data conventionally, whereas the writing redundant data can be finished at high speed by shifting the rotational phase of the redundant device as stated above.

Embodiment 7

The pre-updated parity groups are registered in the parity update information table in the above sixth embodiment. It is also acceptable for the parity update information table to have only a flag of each group in advance, as shown in FIG. 13. "0" in the flag section indicates that the parity of the group is not updated. For example in FIG. 13, flags of the groups 0 and 3 in the redundant groups are "0", which indicates that parities of the groups 0 and 3 are not updated yet. The re-write means 30a performs the operation of updating parities of the groups 0 and 3 based on the flag in the parity update information table.

Embodiment 8

The case of the synchronization of the exclusive disk for the parity being shifted from the synchronization of the other disks is explained with respect to embodiment 6. In this embodiment, the case of recovering data for a new recovery disk when the disk was changed because of failure will be explained.

Figure 14:
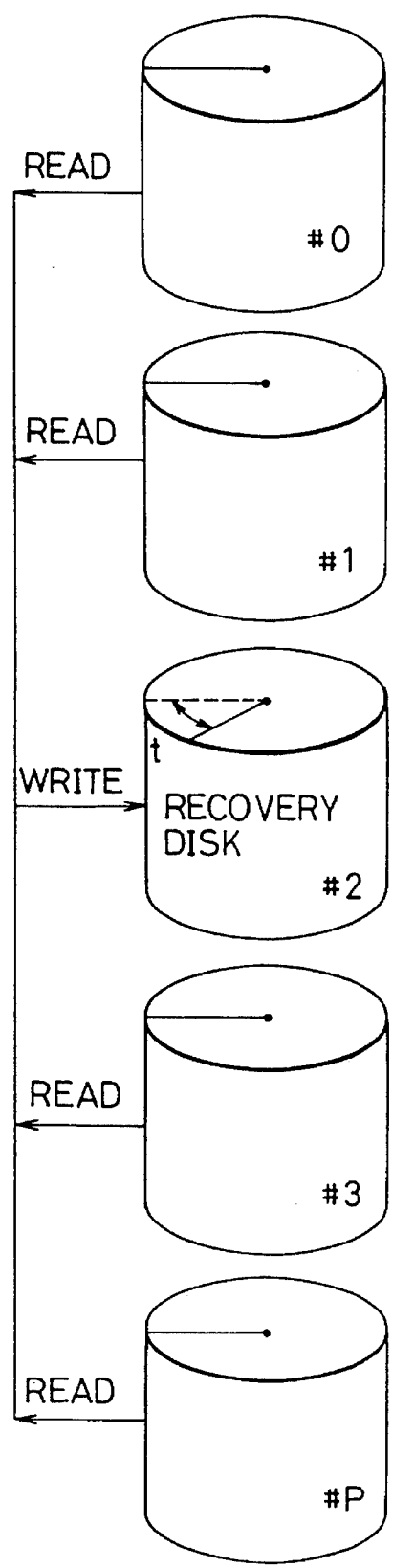
FIG. 14 shows synchronization state of a recovery disk according to an eighth embodiment of the present invention.

If the disk #2 is damaged and a recovery disk is connected as shown in FIG. 14, it is necessary to read data of the disks #0, #1, #3, #P to recover the data of the disk #2. The synchronization control means 60a shifts the synchronization of the disk #2 by the time t from the synchronization of the other disks in rotating. In the case of the damaged data being recovered, the read command of the data is generated at Just before each redundant group based on the position detected by the position detect means, and a reading operation, recovering the data, generating the write command to the recovery disk are performed during the time t. Thus, the efficiency of the recovering operation after exchanging the damaged disk can be improved.

According to the arrayed recording apparatus of this embodiment, a recovering device which exchanges and recovers a failed recording device when the recording device is failed, is provided. Since the rotational phase of the recovering device is shifted from that of the recording devices excluding the recovering device, the re-write means can calculate the recovering data based on the data read from the recording device during the time difference between the rotational phase and can write the calculated recovering data into the recovering device.

According to the arrayed recording apparatus of this embodiment, depending upon the detected rotational position which was detected by detecting the rotational position of the recovering device, the re-write means decides the timing of reading data out from the recording device and generating recovering data.

Embodiment 9

Another embodiment of the arrayed recording apparatus relating to the present invention will now be explained.

Figure 15:
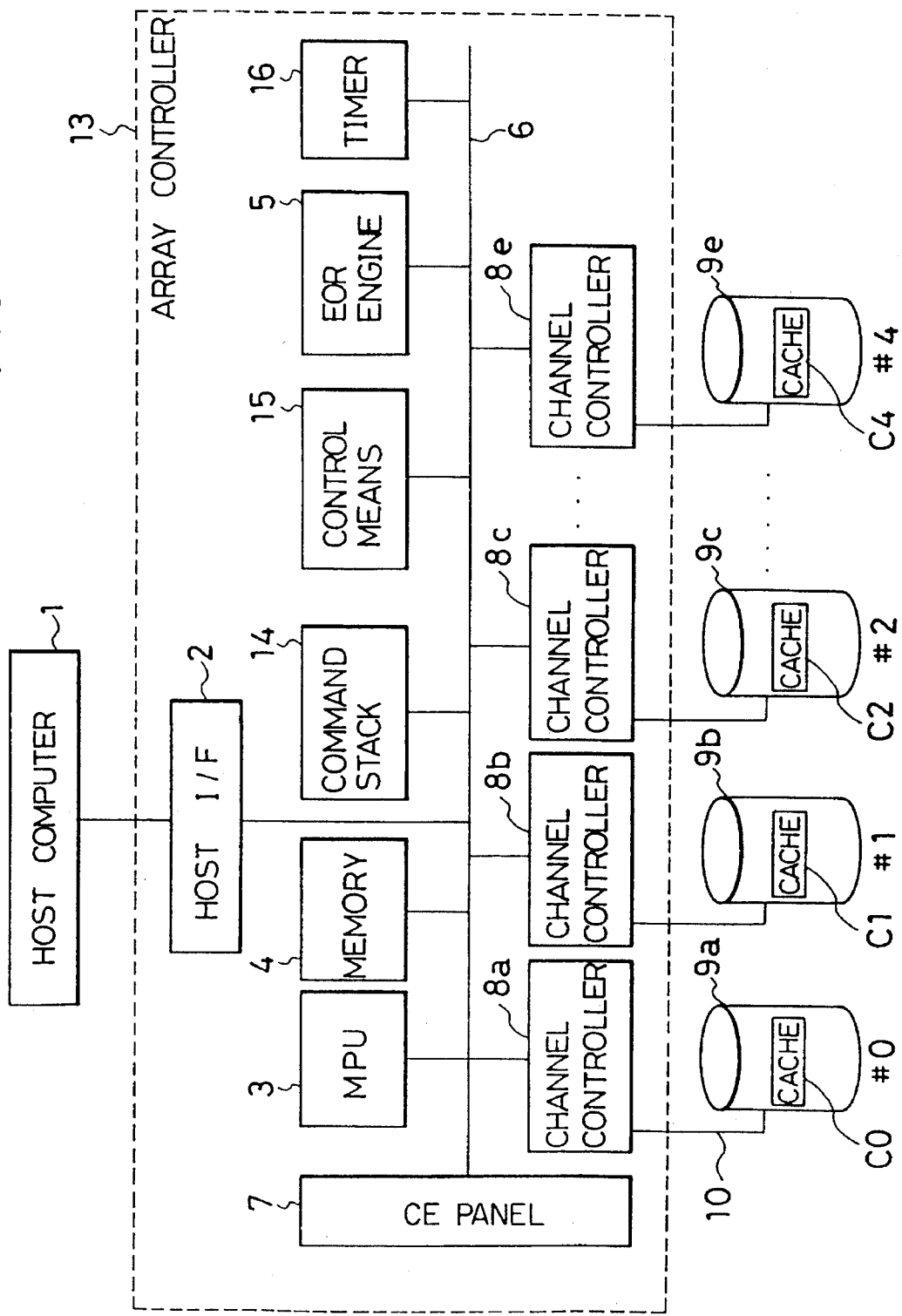
FIG. 15 shows a configuration of an arrayed recording apparatus according to a ninth embodiment.

FIG. 15 shows one example of arrayed recording apparatus of this embodiment. C0, C1, C2 . . . C4 in FIG. 15 are caches implemented for the disk drives #0, #1, #2 . . . #4 respectively.

Figure 16:
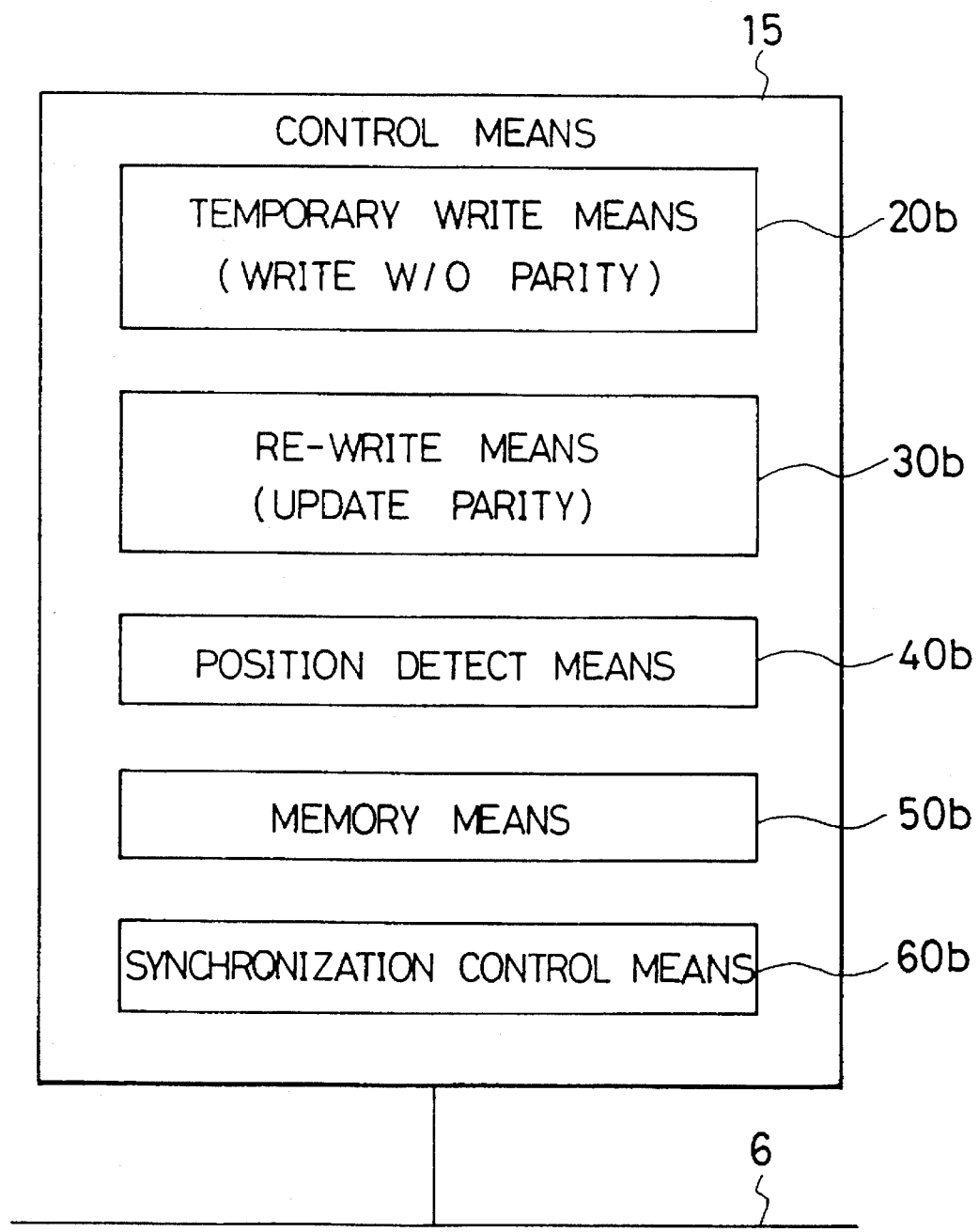
FIG. 16 shows a configuration of a control means of FIG. 15.

FIG. 16 is a block diagram of the control means 15 shown in FIG. 15. A temporary write means 20b writes data without calculating the parity when the data are written. A re-write means 30b calculates and writes the parity of the redundant group that was written without updating the parity by the temporary write means. A memory means 50b stores the redundant groups written without parities by the temporary write means. A synchronization control means 60b synchronizes all the disk drives in rotating.

FIG. 17 explains the operation of this embodiment. The groups 1 and 2 show the case of all the blocks in the redundant group being updated. Therefore, the parity information can be generated without reading old data. Accordingly, when the read command is generated for like the case of group 1 or group 2, data are written right after calculating the redundant data. On the other hand, when data needs to be updated, in the case of group 0 or group 3, it is necessary to read old data. However, the temporary write means 20b can write data without updating the parity even in the case of the group 0 or 3. Then, when the temporary write means 20b writes data without parity, the memory means 50b stores information about the group in the parity update information table as shown in FIG. 18.

For example, concerning the group 0 in FIG. 17, it is stored that data of a logical address 3 has been written and the logical address belongs to the group 0, as shown in the first line of FIG. 18. #3 of the flag indicates that data of the disk #3 has been written already. #4 of the flag indicates that the disk #4 is an area for storing the parity of the redundant group. The time indicates a position where the redundant group is stored.

Concerning the group 3, it is stored that addresses 12 and 13 are already updated as the logical addresses and these addresses belong to the group 3. #1 of the flag indicates that the disk #1 is a parity disk. #2 and #3 of the flag indicate that data of the disks #2 and #3 are already updated. The time indicates a position where the group 3 is positioned. The parity update information table in FIG. 18 is stored in the memory and the memory is non-volatile.

Each disk drive is rotated synchronously by the synchronization control means 60b. The timer 16 measures time based on a spindle synchronization signal of each disk drive. The position detect means 40b detects the rotational position of each disk. When the temporary write means 20b shows a finish of writing data, the memory means 50b stores the position of the data in the time section of FIG. 18.

The re-write means 30b refers to the parity update information table to update the parity. First, the re-write means 30b selects one of groups registered in the parity update Information table. Then, the re-write means 30b generates a pre-fetch command of data of the redundant group for the disk whose flag shows 0 in the group. The pre-fetch command requests to read out the data to the cache in advance from the practical write area in the disk drive in FIG. 15. Each disk drive which gets the pre-fetch command prepares the data in the cache of the disk drive.

For example, concerning the case of the group 0 in FIG. 18, since the flags of the disks #0, #1, #2 are 0, the re-write means 30b generates a pre-fetch command for the three disk drives. The disk drives #0, #1, #2 which gets the pre-fetch commands prepare the data of the group 0 In each cache C0, C1, C2. When the data are prepared in the cache, the disk drive shows the finish of the pre-fetch command. The re-write means 30b updates the flag concerned from 0 to 1 in the parity update information table when the re-write means 30b gets the finish of the pre-fetch command. Concerning the flag corresponding to the disk #3, it is already 1 since the written data remain in the cache C3 of the disk #3 whose data has just been written.

According to the operations stated above, the rewrite means 30b performs the pre-fetch command for disks which were not written and prepares all the data of the redundant group into the caches.

Next, the re-write means 30b performs the operation of calculating the parity of the redundant group 0. The time in the parity update information table is compared to the rotational position of the disk calculated by the position detect means. The read command is generated just before the position where the parity to be written. Since data are already prepared in the cache, it can be read out at once and the parity can be generated and written according to the data.

Figure 19:
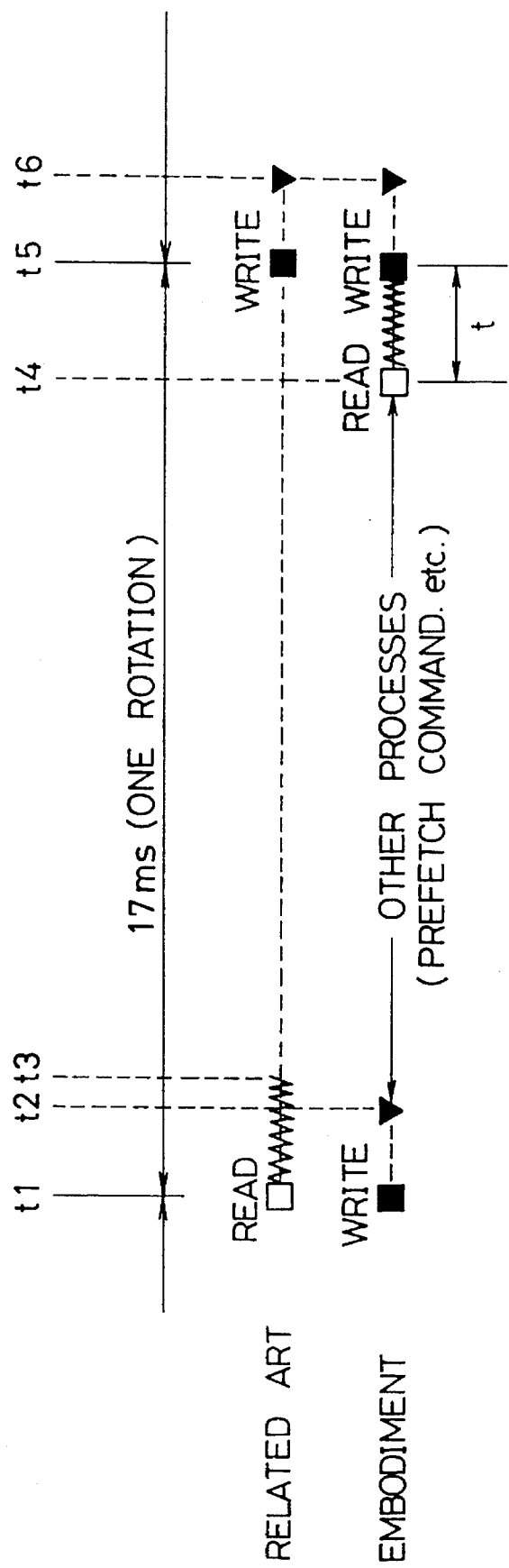
FIG. 19 shows a timing chart of operation of Embodiment 9.

FIG. 19 is a timing chart of this embodiment. Conventionally, old data were read in at the time t1, the parity is calculated and the result of the calculation is written at the time t5. On the other hand, the temporary write means 20b generates the write command at the time t1 and the writing finishes at the time t2 in this embodiment. At this time, the memory means 50b registers a group whose parity is not updated in the parity update information table. The re-write means 30b generates the pre-fetch command during the time t2 and t4. Other processes are performed at the time not occupied. The read command for calculating the parity is generated at the time t4 and the parity is calculated at the time between t4 and t5. Concerning the read command at the time t4, since data to be read from the disk is already in the cache by the pre-fetch command, the data can be read out without waiting for the disk rotating, so that the data can be obtained at high speed. The write command for writing the calculated parity is generated at the time t5 and the writing finishes at the time t6. As it is enough for the time between t4 and t5, that is t, to read the data in the cache and to generate the parity in this embodiment, the time finishes in a short time. It is acceptable for the re-write means 30b to update the parity itself or to output a command for updating the parity to the command stack 14 as stated above.

According to the arrayed recording apparatus of this embodiment, the cache memory is included in the recording device. Data for calculating redundant data are prefetched into the cache memory. The redundant data are calculated at the time when the data has been prepared in the cache memory. Therefore, the re-write means can calculate the redundant data by getting the necessary data at once since the data needed for calculating redundant data is already in the cache memory of the recording device.

According to the arrayed recording apparatus of this embodiment, the position where redundant data should be written is detected in advance by the position detect means. The starting time of the operation of the re-write means is at the time Just before the position where the redundant data should be written. The redundant data are stored In the redundant device at the same time with the finish of calculating the redundant data.

Embodiment 10

A parity update information table is shown in FIG. 18; other systems for storing the information are also acceptable. (1) a logical address number, (2) a disk number of the parity disk of the group, (3) a position in timewise from the spindle synchronization signal of the data, (4) a disk number of the write data of the group, and (5) a number of a disk which is not written and records on the finish of the pre-fetch for the disk, are needed as the parity update information. However, any format for storing them can be acceptable. The information of (1) to (5) can be substituted for another information. It is not necessary for the information of (1) to (5) to be stored as long as the information of (1) to (5) can be calculated or obtained from other information.

Embodiment 11

Another embodiment of the arrayed recording apparatus relating to the present invention is explained.

Figure 20:
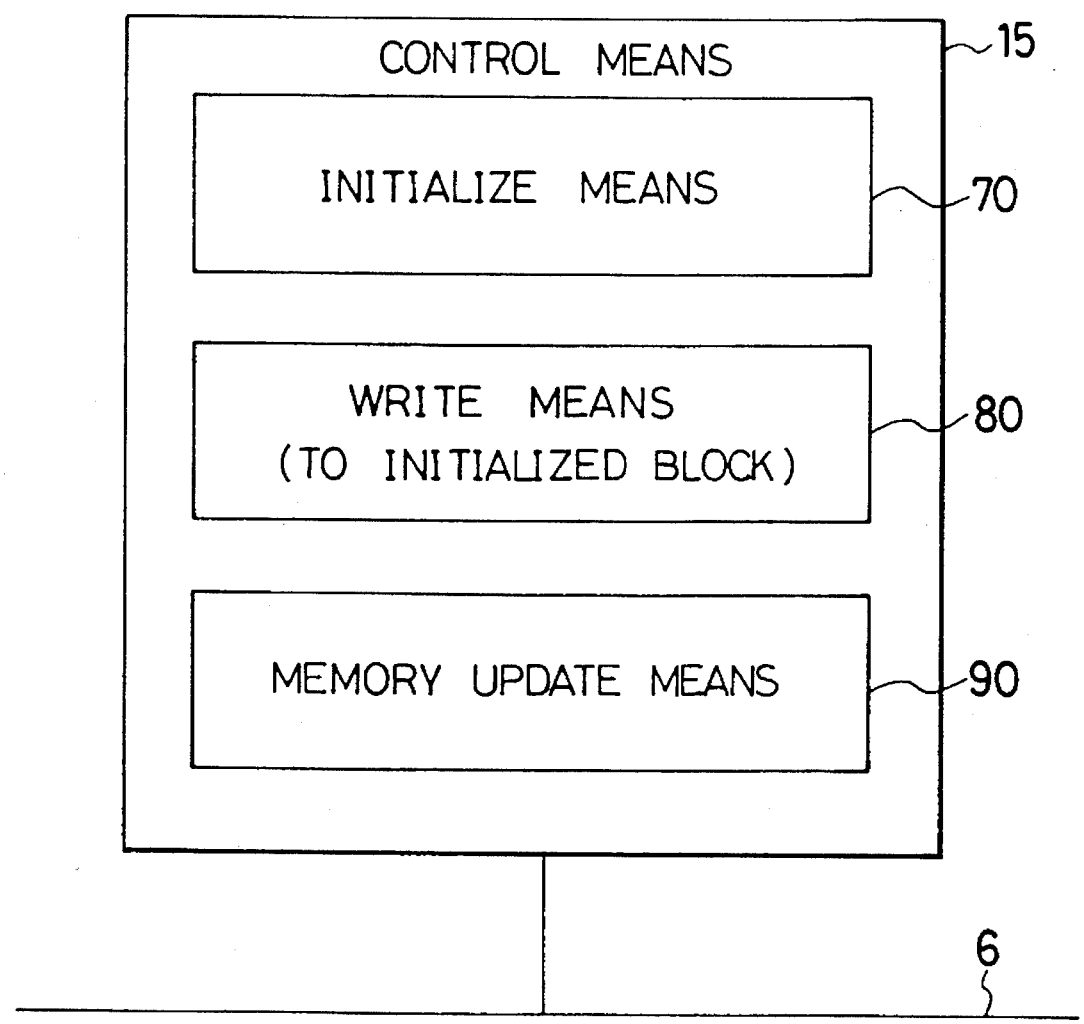
FIG. 20 shows a configuration of a control means of according to an eleventh embodiment of the present invention.

FIG. 20 shows a configuration of the inside of the control means 15 according to embodiment 11. The other parts are the same as the parts shown in FIG. 1 (Embodiment 1)

In FIG. 20, an initialize means 70 initializes the write area of the disk. A write means 80 writes data into the lnitialized block. A memory update means 90 stores the state of each block which was initialized by the initialize means 70 or written data by the write means.

Figure 21:
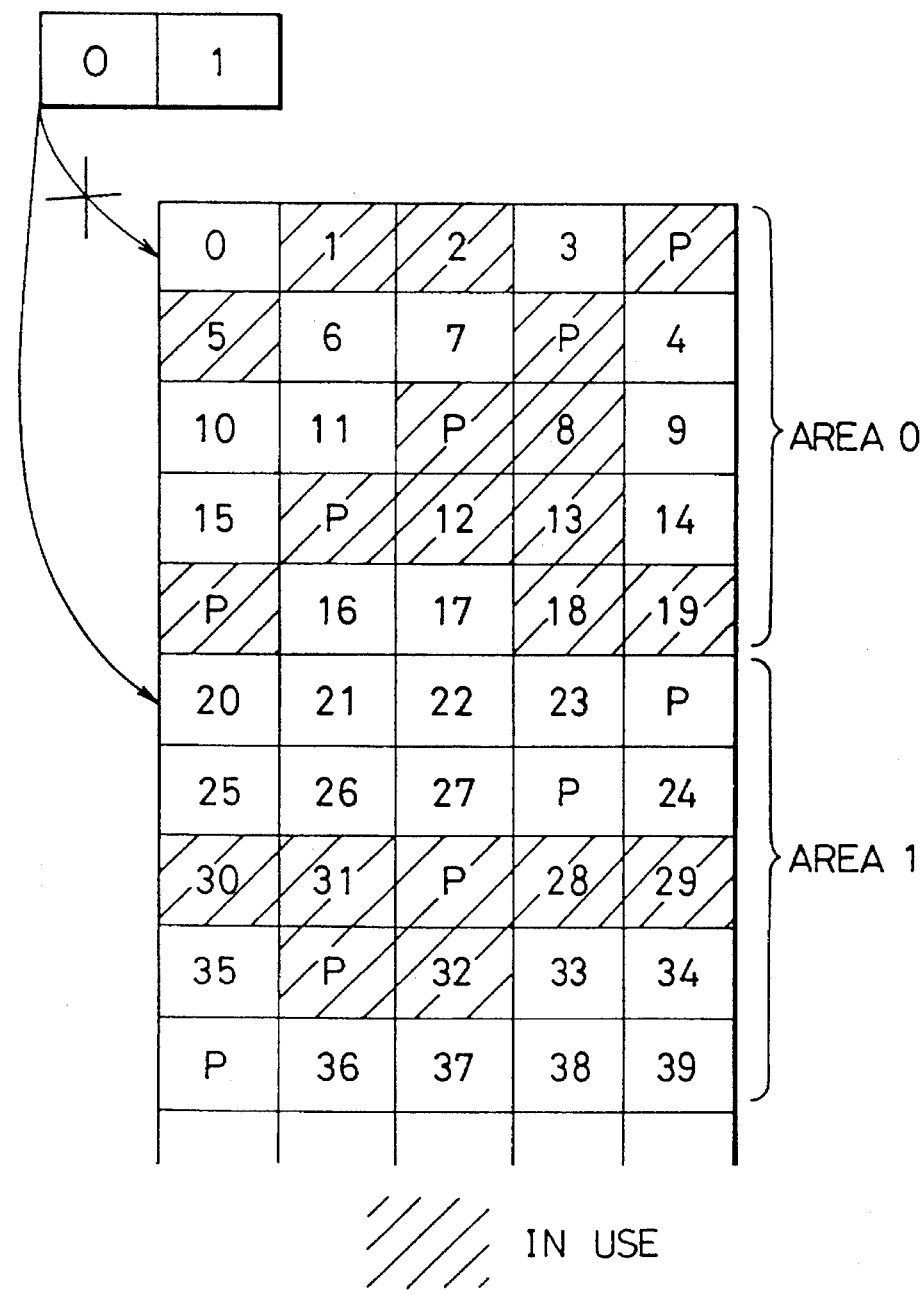
FIG. 21 illustrates operation of Embodiment 11.

FIG. 21 explains a conception of a dynamic mapping of this embodiment. As shown in FIG. 21, the write area of the disk is divided Into plural areas in this embodiment. The first divided area is defined as an area 0, and the second one is defined as an area 1. Each number in each block in the figure indicates a block number. The shaded block indicates that it has been already occupied by data. The block without shades indicates that the block is in initial state where 00 (null code) is stored by the initialize means.

The case of new data being written into such write areas will now be explained. When new data are to be written in the block 1 and the block 0, no new data can be written in them because other data have been already written in the block 1. Instead, the data are written in a block 20 and a block 21 of the area 1 which are corresponding to the block 0 and the block 1 of the area 0. When new data are written, it is not needed to read old data in advance in writing data and a parity since the blocks 20 and 21 are in the initial state. Accordingly, in the case of writing new data in the area 1, only generating the write command is necessary to finish the process. The memory update means 90 stores that the data are written in the another block, not in the block where the data should be written originally.

Figure 22:
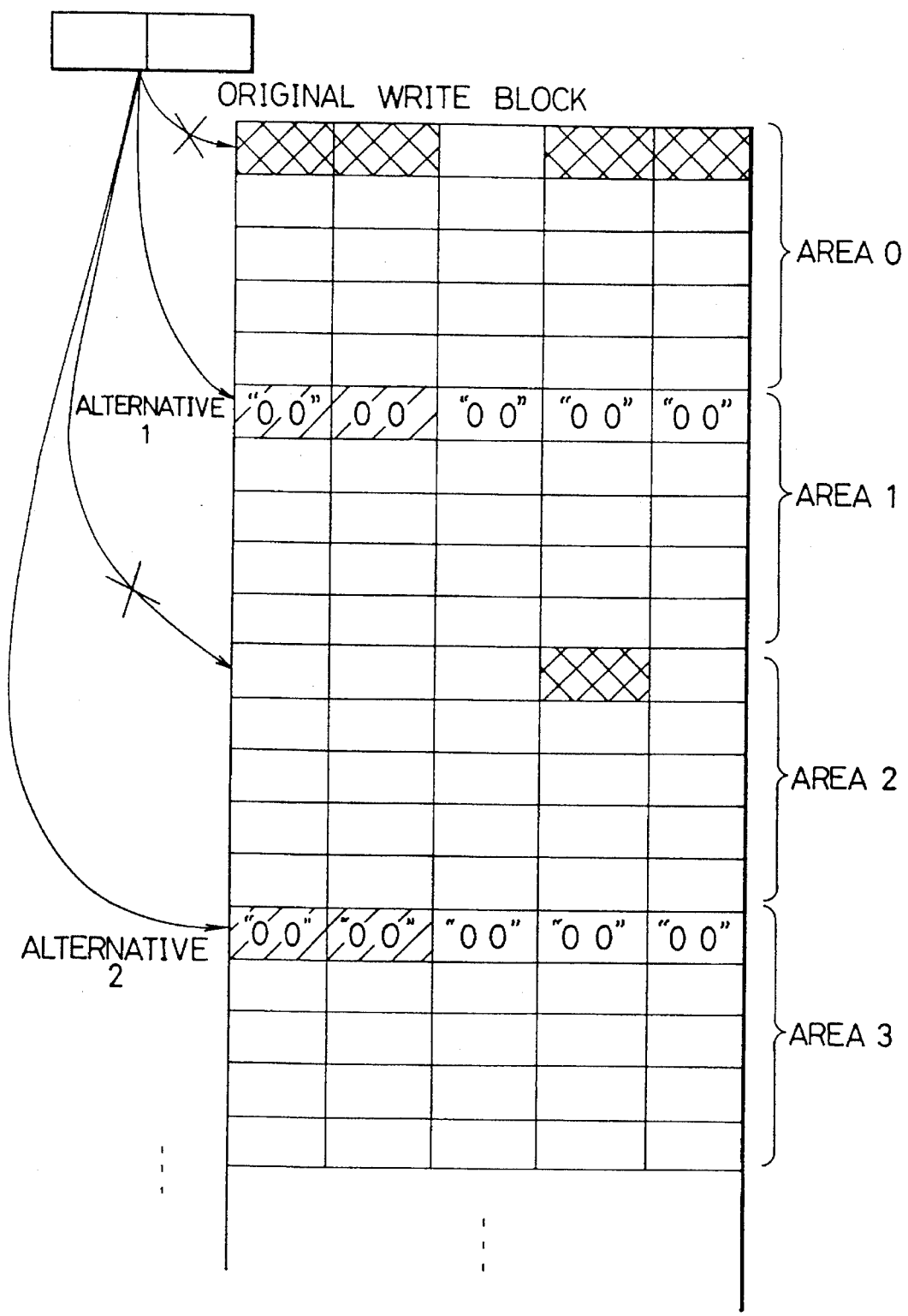
FIG. 22 illustrates operation of Embodiment 11.

FIG. 22 further explains the conception of the dynamic mapping.

When new data are written, if the block where the data should be written originally is in use, another block for writing in another area is detected. The standard in detecting the place is to find out a place not being necessary to read old data in advance. That is, the case of not being necessary to read old data in advance means the case of all the blocks belonging to the redundant group being initialized. The initialize means 70 initializes the entire write area of the disk drive in advance using the 00 (null code). When the write means 80 gets information that the redundant group where data should be written is not in the initial state already, the write means checks each redundant group corresponding to each area to detect the redundant group in the initial state and writes data into the detected redundant group.

FIG. 23 shows an example of a block address control table stored in the memory of this embodiment. This block address control table is the case of the division number being four, that is the number of the divided write areas being four. The number of the block addresses is as many as the number of all the blocks in the entire write area. Write area bit indicates an area where the actual data are written for each block address. Since the number of areas is four in this example, two bits of the writing area bit are enough to show the area where the actual data are written.

In the case that data originally to be written in block 0 and block 1 of area 0 are written in blocks 20 and 21 of the area 1 as shown in FIG. 21, the writing area bit of the block address 00 is updated to 01 from 00. The writing area bit of the block address 01 is also updated to 01 from 00. The in-use flag shows whether the block is used for storing data or not. 1 indicates being in use and 0 indicates being unused yet. In this example, there is no change in the in-use flag of the block address 00, on the other hand, the in-use flag of the block address 01 changes to 0 from 1 since new data are written In the block address 21, which means the original data are not in the block address 01. The 0 flag section indicates whether data in the block are all 00 or not. 0 in the 0 flag section indicates 00, 1 in the 0 flag section indicates data except 00 are stored. Since new data are written in the blocks 20 and 21 in this example, the 0 flags of the blocks 20 and 21 are updated to 1 from 0. Conventionally, the location of the dynamic mapping can be anywhere, which causes the block address control table to be too large. However, by dividing the write area into a plurality of areas, limiting the dynamic mapping to be in the block in the corresponding area and writing data into it as shown in this embodiment, the size of the control table can be reduced.

Supposing that the number of the blocks per one disk is 1M for example, the number of the blocks becomes 5M when there are five disks in the device. Assuming that free mapping can be allowed in the above case, 20 MB of the memory is needed for the block address control table. However, by dividing the area as in this embodiment, the memory can be lessened. For instance, by dividing 5M of blocks into 64 areas and limiting the mapping change within the corresponding blocks in the area, the writing area bit needs 6 bits, though conventionally it needed 23 bits. The memory can be 50000h×1 byte=5 MB. As stated above, the amount can be lessened to be one fourth, 20 MB to 5 MB.

The block address control table is updated by the memory update means 90. When the place where data should be written is updated by the write means, the writing area bit, the in-use flag and the 0 flag are updated. The in-use flag is also updated to 0 from 1 by the memory update means 90 when data are deleted. The 0 flag is updated to 0 from 1 by the memory update means 90 when initialized by the Initialize means 70.

The initialize means 70 performs the operation of initializing all the disk area 00 in advance. If the blocks initialized are kept being consumed or used by the write means, the number of the redundant groups in initial state decreases gradually. Therefore, the initialize means refers to the in-use flag to detect data which have been deleted. When there are deleted data, the initialize means detects the block whose in-use flag is 0 and 0 flag is 1, then, initializes the detected block. Thus, it can be possible for the write means 80 to keep detecting the initialized block as the initialize means keeps initializing the unused or deleted area periodically or occasionally.

When the initialized redundant group is not detected in the corresponding area, data can be read in advance from the area where data should be written originally and the operation of calculating and rewriting the redundant data can be performed. Therefore, no trouble occurs even when the write means 80 can not detect the initialized redundant group.

According to the arrayed recording apparatus of this embodiment, all the write areas have been initialized in advance and the initialized write areas are divided into the specific number, so that data are always written into the initialized area. When there are data already in the write area where data should be written, a corresponding area in the divided area is detected. Then the data are written into the detected area which is in initial state. Accordingly, as data to be written are always in initial state, there is no need of calculating redundant data. However, the memory stores the substitute area since the area substitution occurs frequently when data are written. As stated above in the Related Art, when the free mapping change is allowed, the write areas are divided into plural areas since the memory size becomes large. The memory does not store addresses of the substitute blocks but stores the substitute divided area, so that data amount to be stored is lessened. As the area, to be stored, being in initial state is detected for writing, information which shows the block is in initial state or not is stored in the memory.

According to the arrayed recording apparatus of this embodiment, when data are written into the block in initial state as stated above, the initialize means initializes blocks which are not in use, to prevent blocks in initial state becoming running out. Then, information, indicating the block being initialized by the initialized means, is updated to be in initial state in order to use the block again.

As stated above, it is a feature of this embodiment to lessen the time for writing process by writing data in an open area of the disk. It is aimed to lessen the memory amount of the control table by limiting the area of address changing to some extent so as to cut the cost.

Embodiment 12

Another embodiment of the arrayed recording apparatus of the present invention will be explained.

Figure 24:
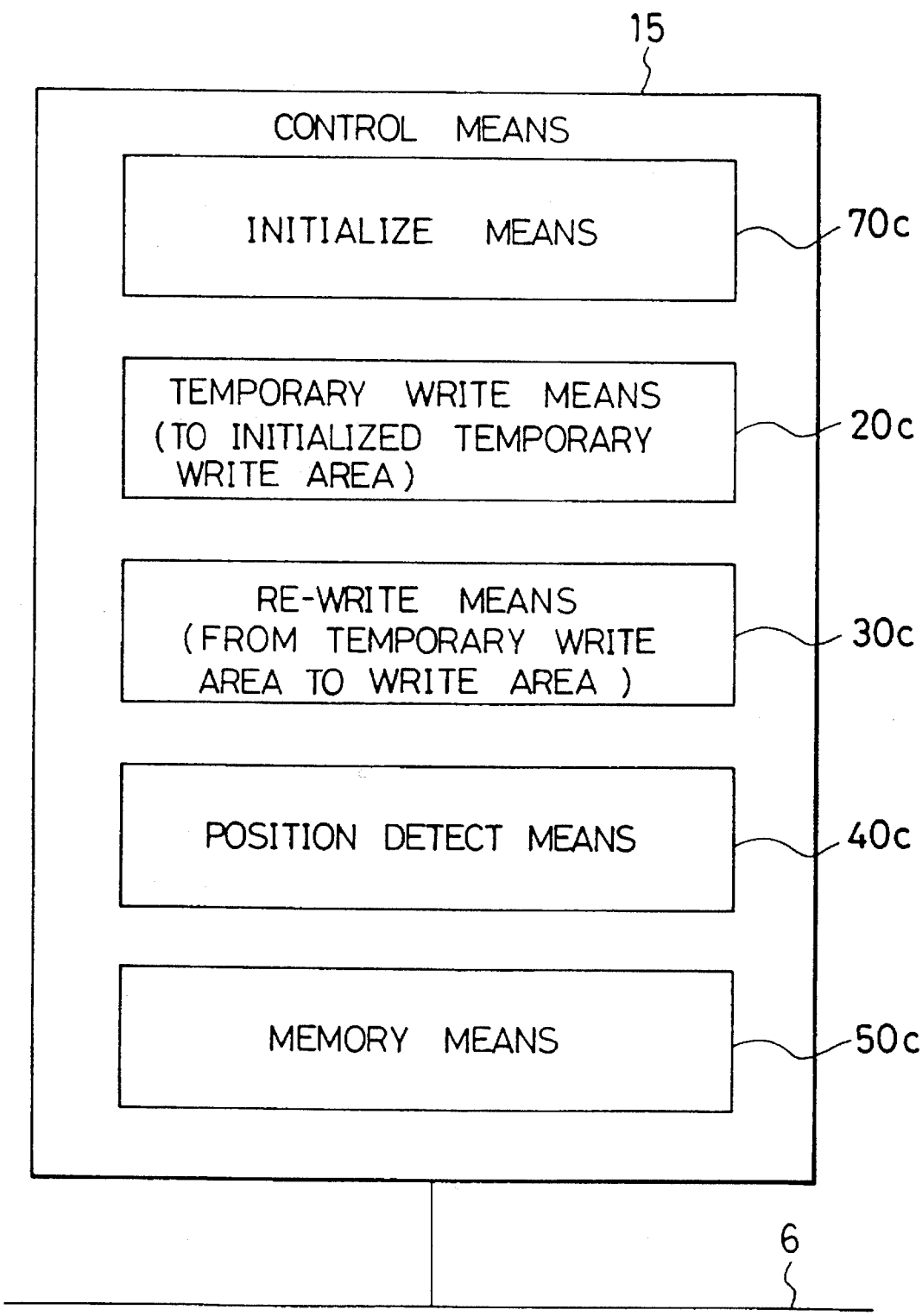
FIG. 24 shows a configuration of a control means of Embodiment 12.

FIG. 24 shows a configuration of the control means 15 of this embodiment. The memory area being controlled is divided into a normal data area and the temporary write area in this embodiment. An initialize means 70c initializes the temporary write area.

A temporary write means 20c writes data into the temporary write area initialized by the initialize means 70c. A re-write means 30c rewrites data written in the temporary write area by the temporary write means 20c to the original write area. A position detect means 40c detects a rotational position of the disk. A memory means 50c stores information on data written temporarily by the temporary write means.

FIG. 25 shows an operation of this embodiment. In the case of updating the disks #0, #1, #3, #4 of the group 1, it has been needed conventionally to read old data in advance and rewrite after producing the parity. However, in this embodiment, as the temporary write area has been prepared in advance and the temporary write area has been initialized by 00 (null data) of the initialize means 70c, the temporary write means 20c writes the data into the initialized temporary write area without calculating the parity, namely, the process can be finished at only one write command. Accordingly, in the case of writing data in the group 1, reading data in advance can be omitted by writing the data of the group into the area 1 in the temporary write area.

FIG. 26 shows an example of the temporary write information table stored in the memory by the memory means 50c when the temporary write means writes data into the temporary write area. This memory is non-volatile so as not to lose data in case of trouble happening. The flag and the data address are provided to correspond with each area in the temporary write Information table. The case of the flag being 1 indicates that the corresponding area in the temporary write area has been already used. The address of data to be written originally in the case of the flag being 1 is written in the data address. As data of the group 1 are written in the area 1 temporarily in this embodiment, the flag comes 1 and the address of the group 1 is written as the data address in this embodiment. As shown in FIG. 25, the temporary write area for area 2 and area 3 has not been used, the flag is 0 and the data address has not been written.

The re-write means 30c refers to the temporary write information table to detect the flag being 1. After detecting the flag being 1, the re-write means 30c detects the corresponding data address in the area concerned and rewrites the data in the area concerned to the detected data address. When the re-write means finishes rewriting data, the flag turns to 0 again.

Since the initialize means 70c judges that rewriting has finished when the flag is 0 and the data address has been written, the temporary write area is initialized again by the initialize means 70c. Accordingly, the temporary write area initialized by the initialize means 70c can be used again by the temporary write means 20c. The operation of rewriting of the re-write means 30c can be performed by the re-write means 30c itself or it is also acceptable to be performed by outputting the rewrite command to the command stack 14.

According to the arrayed recording apparatus of this embodiment, the temporary write means 20c writes only the data to be stored directly into the temporary write area, whereas the temporary write means of the other embodiment writes the data to be stored and the redundant data into the temporary write area after calculating the redundant data. Accordingly, the temporary write means 20c of this embodiment does not calculate redundant data. Namely, data in the write area are not needed to be read out, data given by the write command are written into the temporary write area. However, this temporary write area has been initialized in advance by the initialize means. Therefore, in the case of data being written in the initialized temporary write area, only writing process is performed because the data can be written without calculating redundant data. The re-write means reads the data in the temporary write area and the data in the write area to calculate redundant data and writes the calculated redundant data In the write area. The performance of the re-write means is not synchronized with that of the temporary write means.

Embodiment 13

The case of the temporary write information table being used as shown in FIG. 26 has been explained with respect to embodiment 12. It is also acceptable to use another temporary write information table as shown in FIG. 27. The feature of the temporary write information table of FIG. 27 is having a time section. The initialize means 70c initializes the temporary write area at the system starting and simultaneously sets up the time in the temporary write information table in advance. For example, in the case of the area 1 of the temporary write area being at the top of the index mark and the areas 2, 3, 4 being located in order, the time which indicates a position of each area in timewise is set up as shown in FIG. 27. Namely, 0.00 ms for the area 1, 0.25 ms for the area 2, 0.50 ms for the area 3 and such are set in the time in advance.

When the temporary write means 20c writes data into the temporary write area, the temporary write means 20c checks time set in the temporary write information table to detect a temporary write area being at the closest when the temporary write means has prepared to write data and being in the initial state, from the temporary write information table. Then, the temporary write means 20c writes data into the detected area.

The re-write means 30c refers to the time in the temporary write information table and generates the read command to the temporary write area at the best time for reading data from the temporary write area when the re-write means 30c rewrites data based on the comparison result of the referred time and the rotational position of the disk detected by the position detect means 40c. Therefore, the operation of reading from the temporary write area by the re-write means is performed at high speed without having wasteful waiting time for rotation.

Embodiment 14

Figure 28:
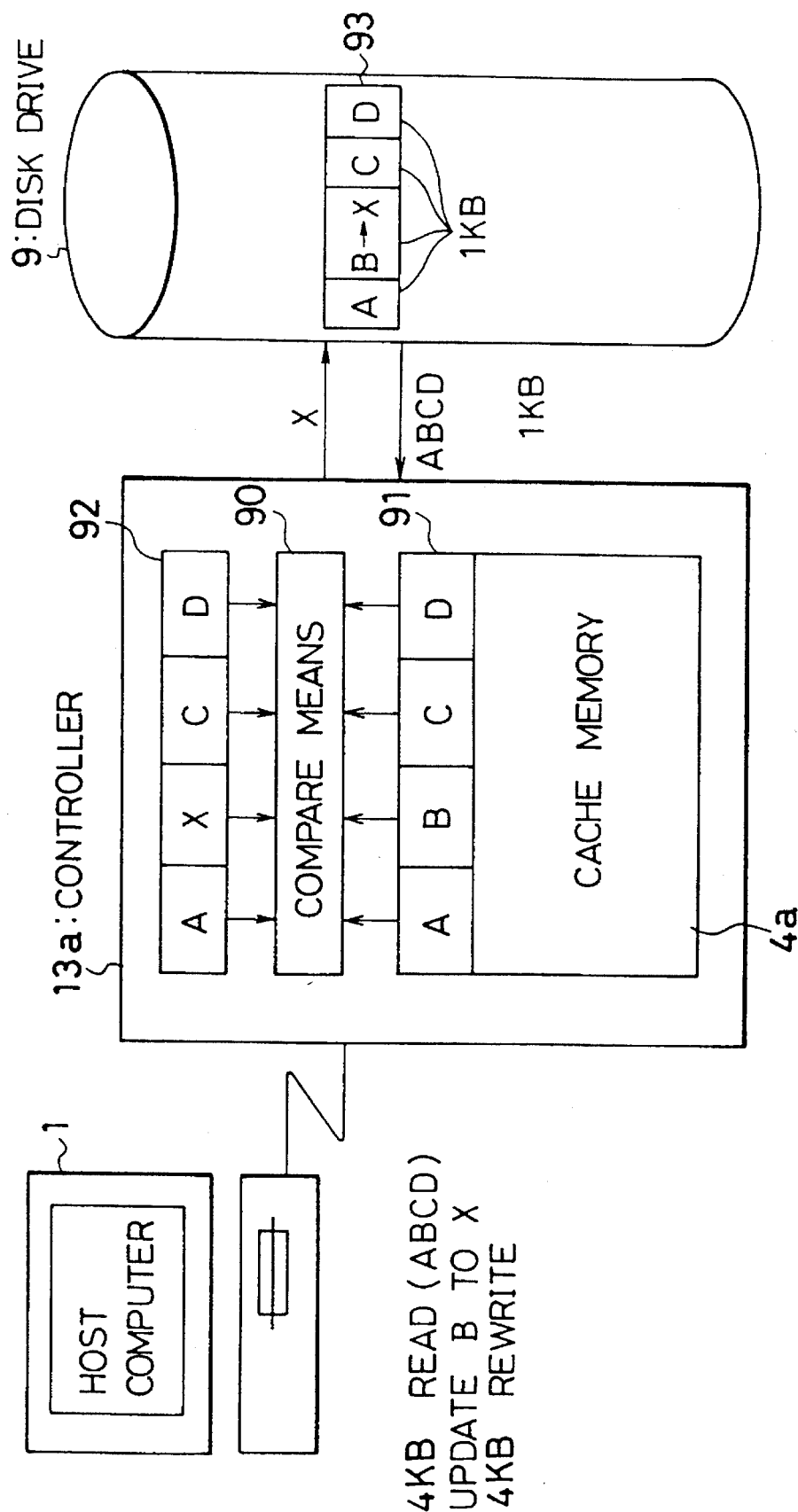
FIG. 28 shows a configuration of a recording apparatus of Embodiment 14.

Another embodiment of the recording apparatus relating to this invention will be explained with respect to FIG. 28. In the figure, a host computer 1 is provided. A controller 13a is connected with the host computer. A disk drive 9 is connected with the controller 13a. A cache memory 4a is implemented in the controller 13a. A compare means 90 is also implemented in the controller 13a. Data 91, 92, 93 are accessed and processed respectively.

The operation is as follows. The host computer 1 accesses a read/write in a specific unit size to the controller of the disk drive. In this example, the data access to the controller is performed as a unit of 4 KB. Depending upon the read command of 4 KB from the host computer, the controller 13a also accesses data in a specific unit which is defined between the controller 13a and the disk drive 9 In advance and reads out the data. For instance, reading using 1 KB as a unit is performed here. The controller 13a reads out data A, B, C, D, using 1 K as the unit, from the disk drive 9 and stores the data in the cache memory 4a. The read out data A, B, C, D of 4 KB in total, are transferred to the host computer 1. The host computer 1 updates the read out data. The host computer 1 updates data B to data X, for instance. Then, the host computer generates the rewrite command to write data A, X, C, D of 4 KB into the disk drive 9 now. The controller 13a receives the rewrite command from the host computer 1. The compare means 90 compares the data A, B, C, D stored in the cache memory 4a with the data A, X, C, D sent from the host computer 1 by the rewrite command. The comparing is performed at 1 KB which is the access unit between the controller 13a and the disk drive 9. When the compare means 90 judges that only B is updated to X and the other A, C, D, are not updated, the compare means 90 requests the disk drive 9 to update only data of X. Although a write command of 4 KB unit from the host computer 1 is commanded at every disk drive, only updated part is picked up by the compare means 90 and the write command only for the updated data is performed according to the above stated. The data A, C, D out of the data A, X, C, D sent from the host computer i are ignored and discarded at the controller 13A.

According to the disk drive of this embodiment, minimum amount of data are updated in the recording device by using the difference between the access unit for the host machine and the access unit for the recording device. Generally, the data access unit for the host machine is larger than access unit for common recording device. Therefore, when data, read out from the recording device, being composed of plural access units are stored in the cache memory, and when a part of the read out data are modified and rewritten by the host machine, the compare means detects only the updated part by comparing, then only the updated data are written into the recording device. Namely, even when the write command for all the data is generated from the host machine, only the updated data are written into the recording device practically.

As described above, since it is not necessary to write parts which are not needed to be updated out of the write data sent from the host computer, the writing process can be finished at high speed.

Embodiment 15

Figure 29:
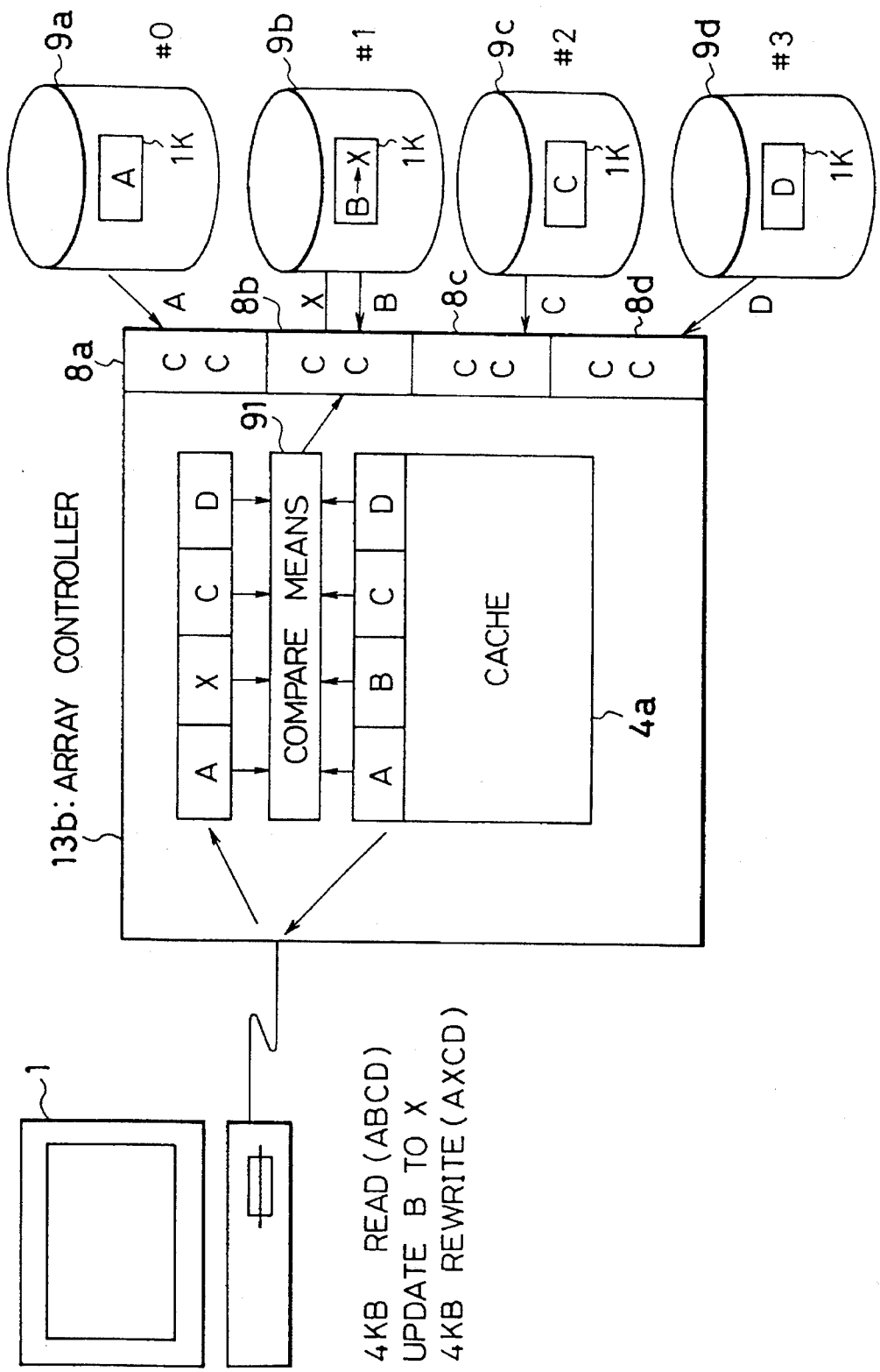
FIG. 29 shows a configuration of a recording apparatus of Embodiment 15.

FIG. 29 shows another embodiment of the recording apparatus relating to the invention. The arrayed recording apparatus differs from embodiment 14 in that it comprises a plurality of disk drives. An array controller 13b comprises channel controllers 8a, 8b, 8c, 8d corresponding to each disk drive 9a, 9b, 9c, 9d. As stated above, a compare means 91 compares data which are not updated yet and stored in the cache memory 4a with data sent by the write command from the host computer, at 1 KB unit respectively. When there are different data after the comparing, the compare means 91 generates a command of data updating to the channel controller corresponding to the data. As data for the disk 9b have been updated to X from B in this example, the write command is generated only to the channel controller 8b. The channel controller 8b writes the data X into the disk drive 9b. The other data A, C, D, are ignored and discarded in the array controller 13b.

According to the disk drive of this embodiment, the arrayed recording apparatus is composed of recording devices, each recording device accesses data per block unit and the host machine accesses data per plural blocks. Accordingly, based on the result of comparing by time compare means, only updated blocks are renewed.

Embodiment 16

Figure 30:
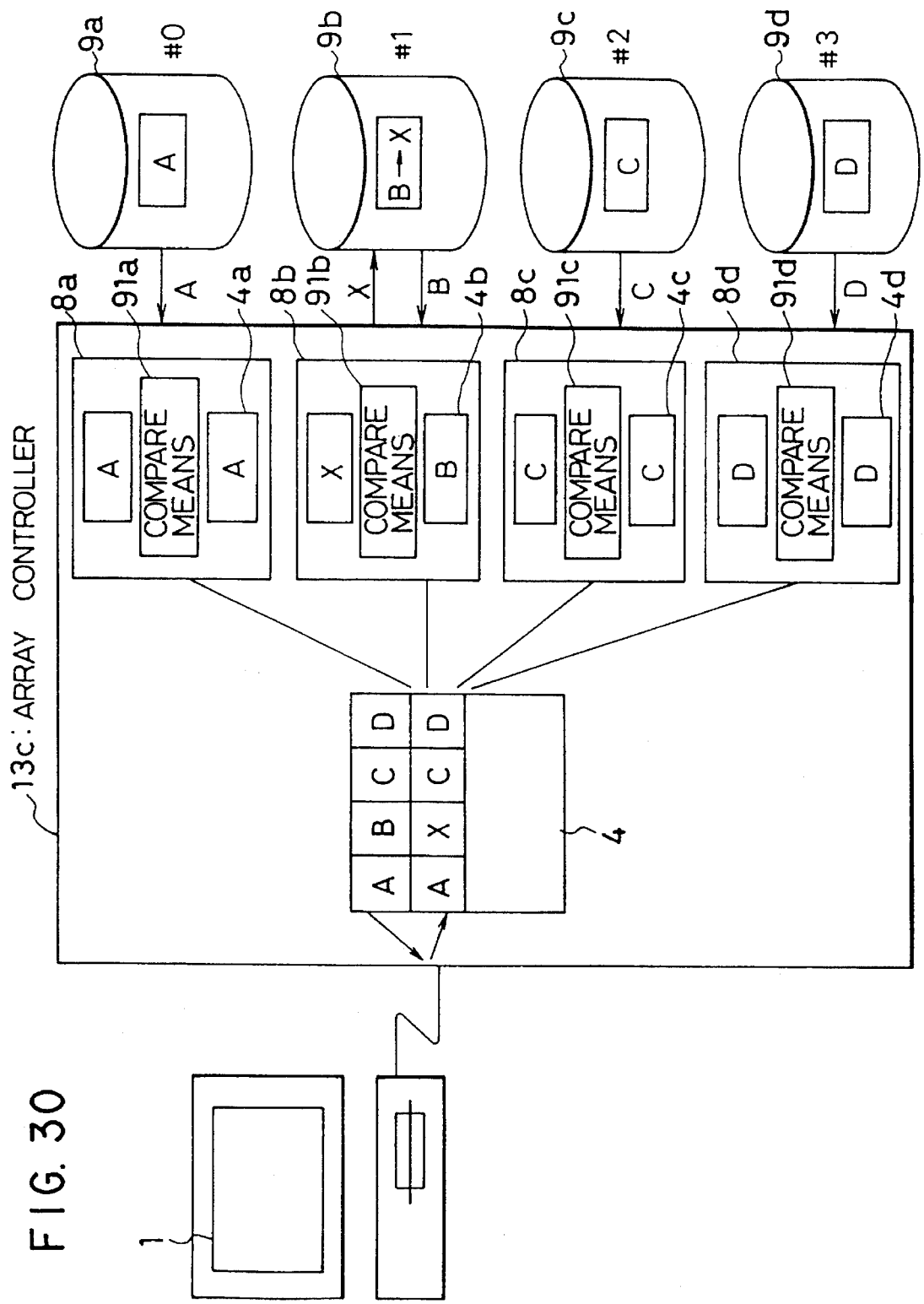
FIG. 30 shows a configuration of a recording apparatus of Embodiment 16.
Figure 31:
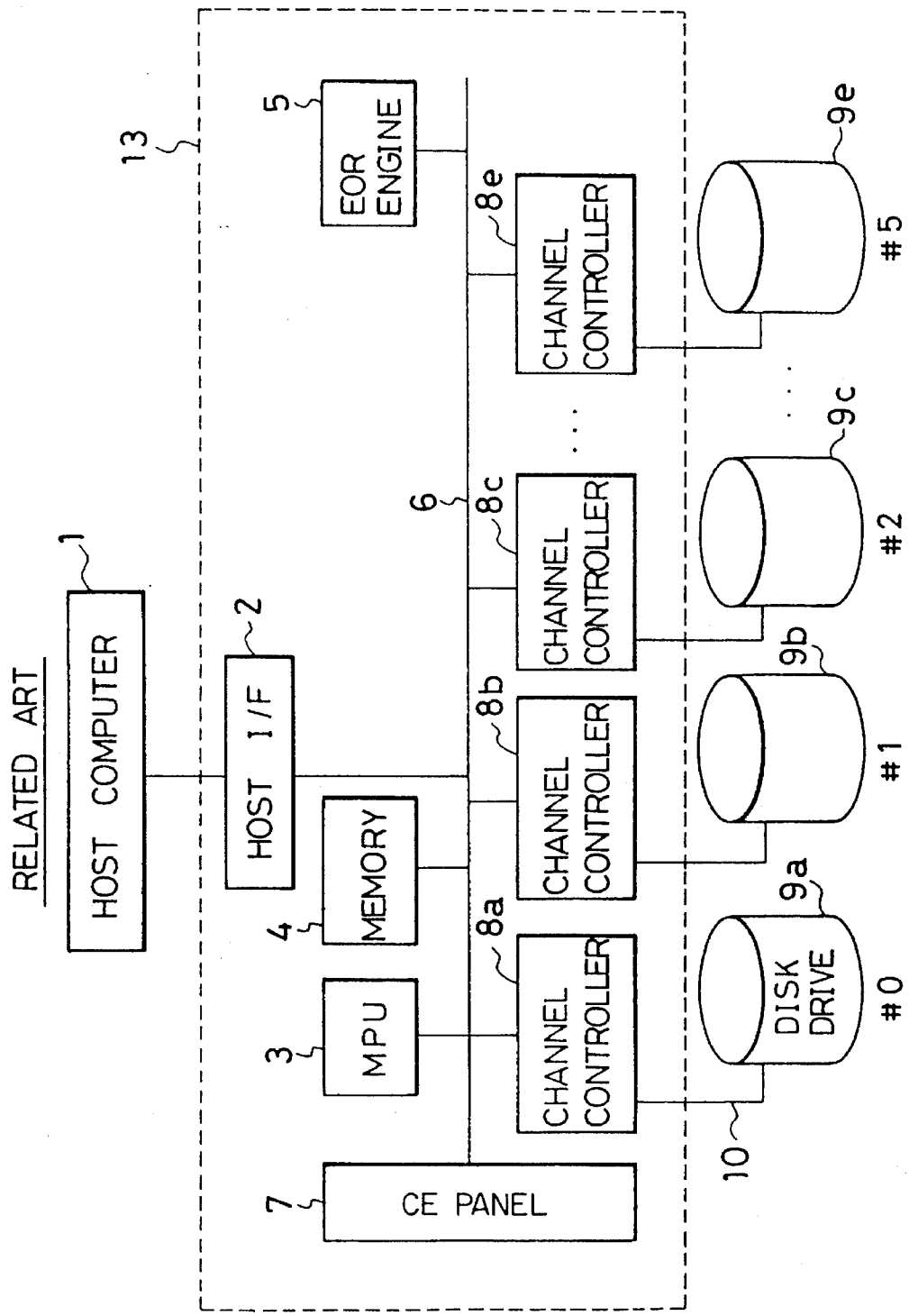
FIG. 31 shows a configuration of an arrayed recording apparatus of Related Art.
Figure 32:
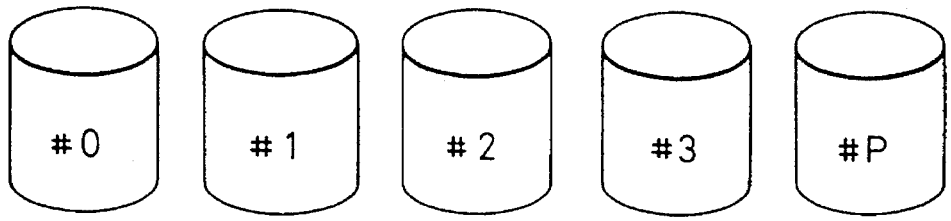
FIG. 32 illustrates a method of calculating a parity.
Figure 33:
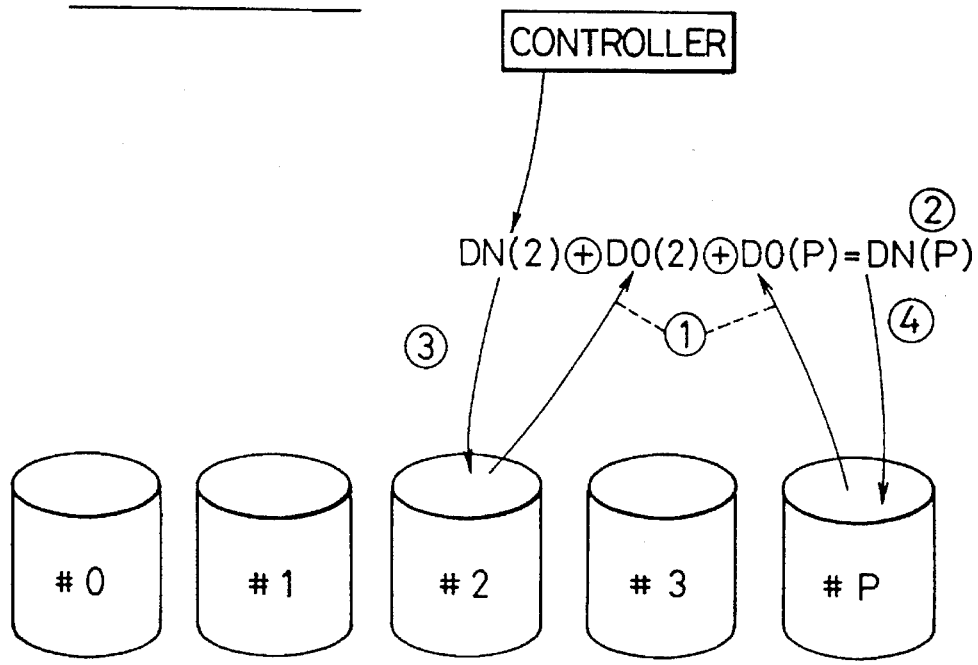
FIG. 33 illustrates a method of calculating a parity.
Figure 34:
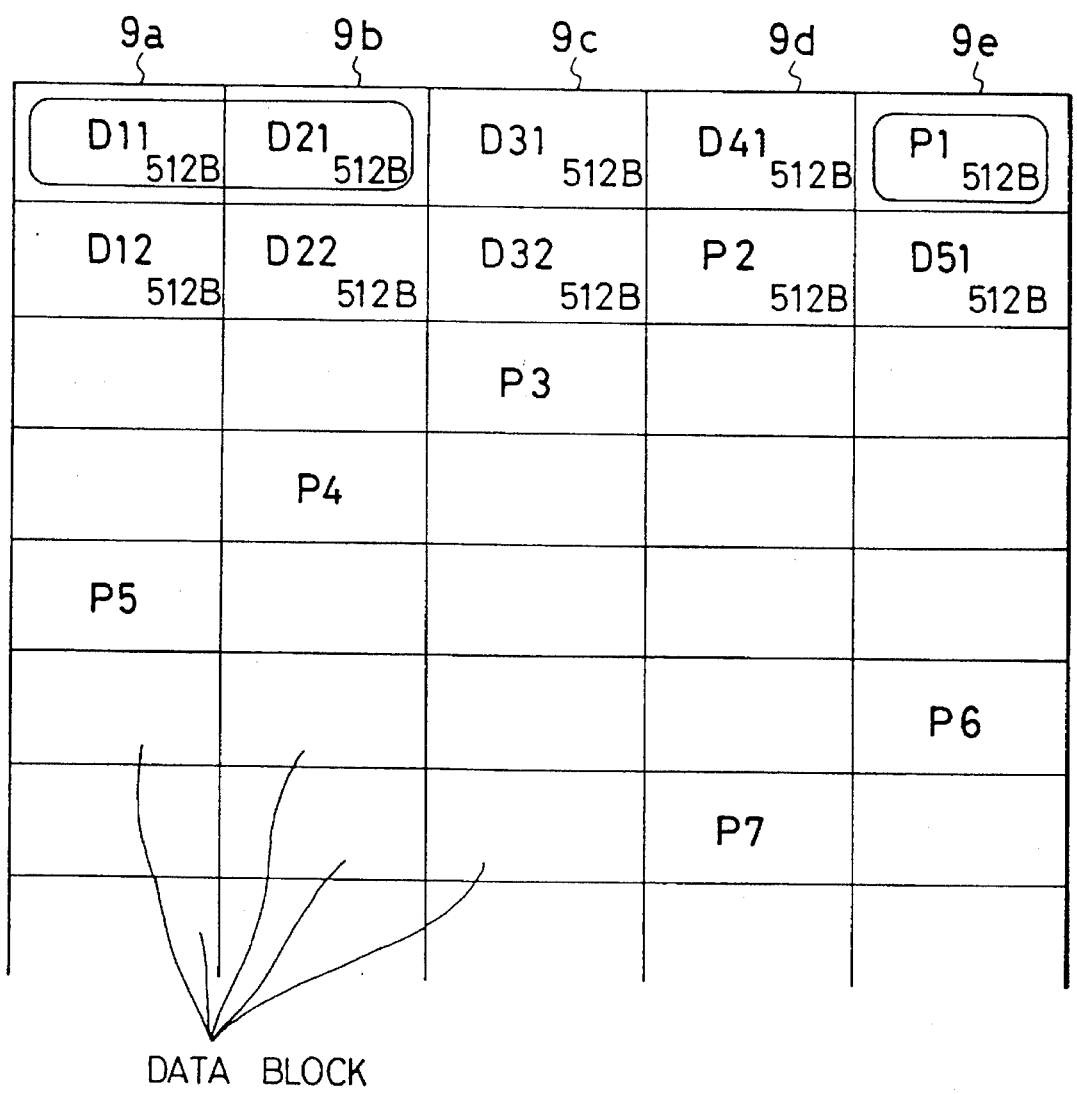
FIG. 34 illustrates a data block and a redundant group.
Figure 35:
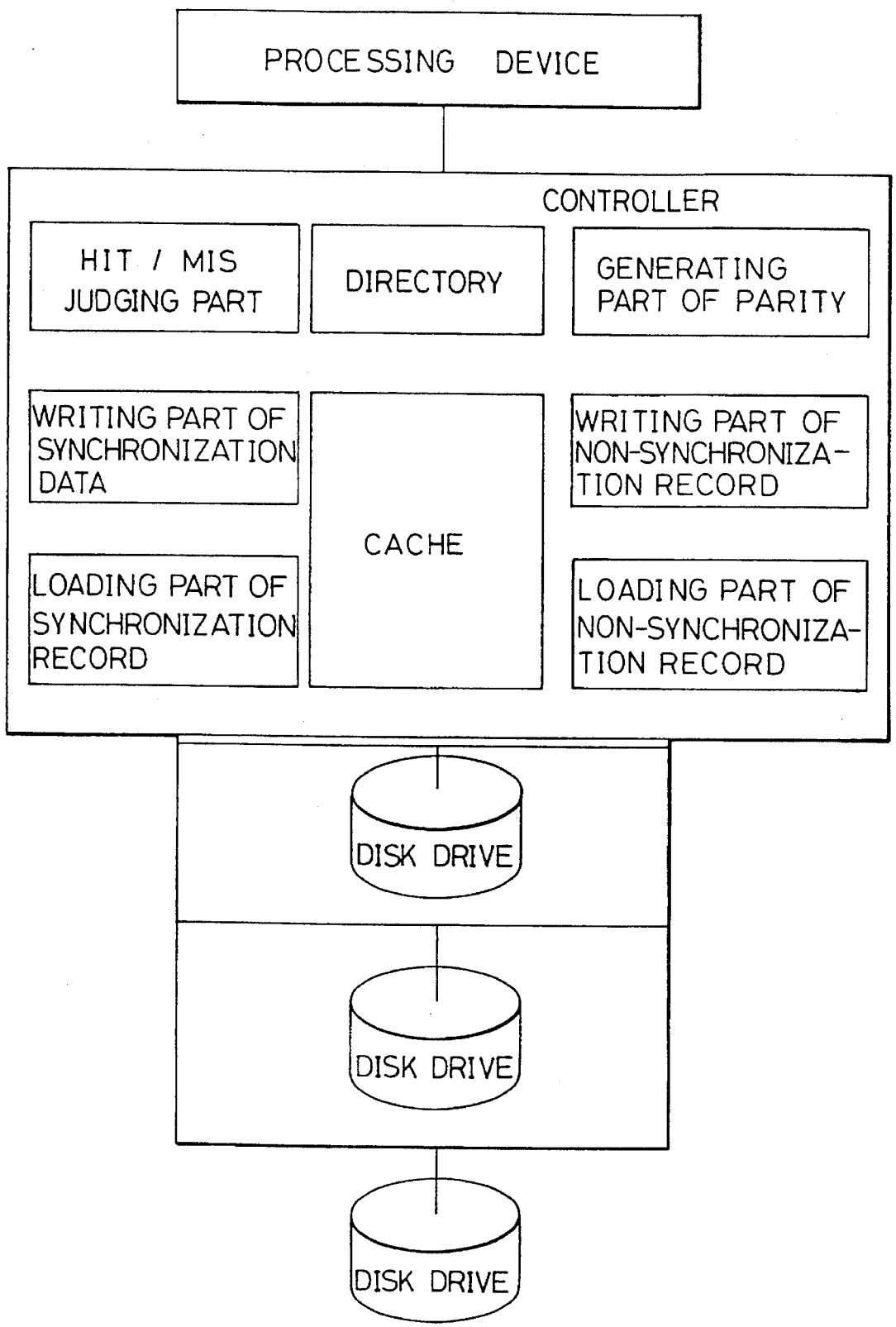
FIG. 35 shows an example of an arrayed disk drive of Related Art.
Figure 36:
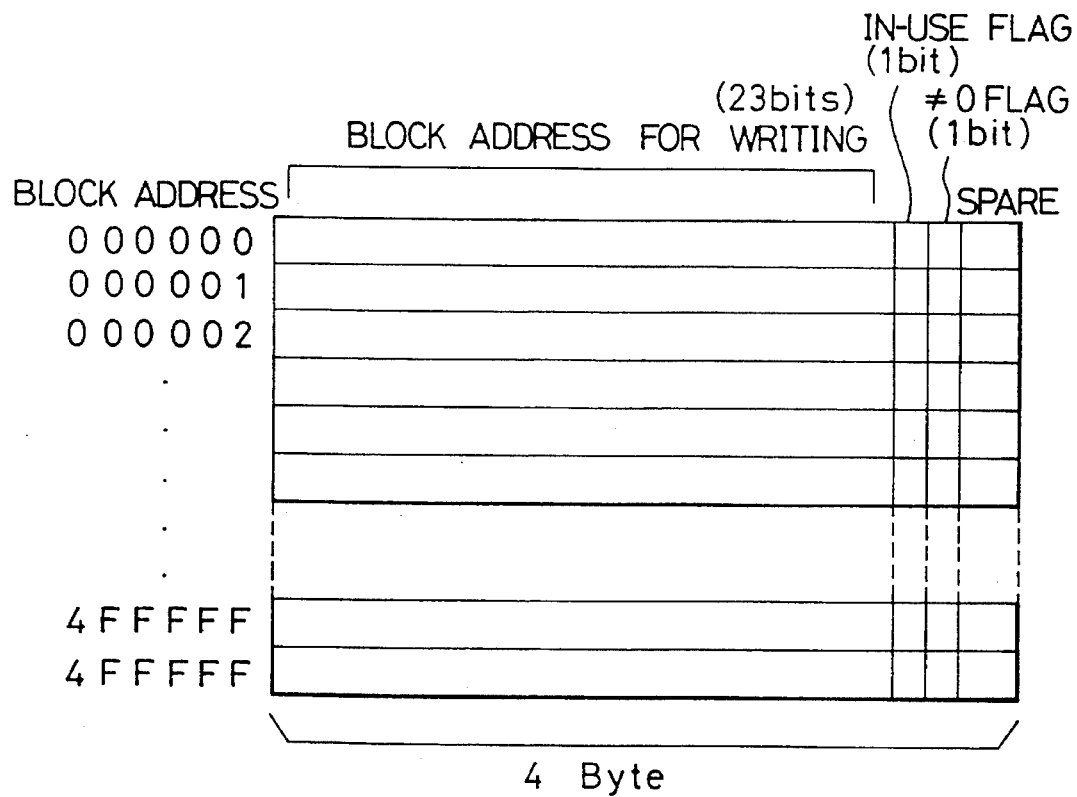
FIG. 36 illustrates a block address control table of Related Art.

FIG. 30 shows another embodiment of the recording apparatus relating to tills invention, in which there is a compare means in each channel controller. Each channel controller comprises a cache memory 4a, 4b, 4c, 4d respectively. The compare means compares data stored in the cache read from each disk drive with data of the write command sent to each disk from the host computer 1 by the array controller 13c. As the data B have been updated to the data X in this embodiment, when the compare means 91b in the channel controller 8b detects a difference among the data, the compare means 91b requests the disk drive 9b to write the data X. Compare means 91a, 91c, 91d in the channel controller 8a, 8c, 8d detects that the data in the cache are the same as the data to be written. Then, no write command is generated to the disks 9a, 9c, 9d.

According to the disk drive of this embodiment, the cache memory is implemented corresponding to the recording device and the need of data updating or not is judged per recording device.

Though it has not been stated about a kind of the recording device especially in the embodiments, a magnetic disk drive, a laser disk drive, a compact disk drive and such can be used as the recording apparatus. It is also acceptable to use different kinds of recording apparatus together.

What is claimed is:

1. An arrayed recording apparatus comprising:

a plurality of recording devices each of which rotates, has a write area with a plurality of blocks and a temporary write area, and stores data in a block unit, and an array controller for accessing data and redundant data recorded in the blocks of the plurality of recording devices as a group, said array controller including temporary write means for writing data in a temporary write area of one of the plurality of recording devices when data are ready to be written in write area of the one of the plurality of recording devices, memory means, for storing in a memory an original data recording location of the write area corresponding to data written in the temporary write area, and re-write means for rewriting the data written in the temporary write area to the write area according to the original data recording location of the write area stored by the memory means.

2. The arrayed recording apparatus of claim 1, wherein the array controller further comprises position detect means for detecting rotational position of the recording device, and wherein the temporary write means writes data in an available area in the temporary write area according to the rotational position of the temporary write area detected by the position detect means.

3. The arrayed recording apparatus of claim 1, wherein the array controller further comprises position detect means for detecting rotational position of the recording device, the memory means stores a data position of the temporary write area where the temporary write means writes data, and the re-write means starts to relocate data according to the data position of the temporary write area stored by the memory means and the rotational position detected by the position detect means.

4. The arrayed recording apparatus of claim 1, wherein the temporary write means calculates redundant data based on a group of data and writes the redundant data in the blocks of the temporary write area, and the re-write means relocates the redundant data written in the blocks of the temporary write area to the original blocks of the write area.

5. The arrayed recording apparatus of claim 1, wherein the array controller further includes initialize means for initializing the temporary write area, wherein the temporary write means writes data to be written in the write area in the temporary write area initialized by the initialize means without reading necessary data in a group for calculating redundant data in the write area in advance, and wherein re-write means calculates redundant data based on data in the temporary write area and data in the group to be updated originally in the write area and records the redundant data to the write area.

6. An arrayed recording apparatus comprising:

a plurality of recording devices each of which rotates, has a write area with a plurality of blocks, and store data in a block unit, wherein at least one of the recording devices includes a temporary write area separate from a write area, and wherein the recording devices include at least one redundant device for recording the redundant data, an array controller for accessing data and redundant data recorded in the blocks of the plurality of recording devices as a group, said array controller including: temporary write means for writing data into a temporary write area of one of the recording devices without calculating redundant data, memory means, for storing a data position in a memory where the temporary write means writes data, and re-write means for reading necessary data for calculating redundant data in a group wherein data written by the temporary write means belongs according to the data position stored by the memory means, calculating redundant data based on the data read, and recording the redundant data into the redundant device.

7. The arrayed recording apparatus of claim 6, wherein the array controller further includes synchronization control means for shifting a rotational phase of a redundant device from a rotational phase of the other recording devices for a predefined period, and wherein the re-write means calculates the redundant data in the predefined period provided by shifting of the rotational phase of the redundant device from the rotational phase of the recording devices.

8. An arrayed recording apparatus comprising:

a plurality of recording devices each of which rotates, has a write area with a plurality of blocks, and stores data in a block unit, wherein each of the recording devices has a cache memory, an array controller for accessing data and redundant data recorded in the blocks of the plurality of recording devices as a group, wherein said array controller includes temporary write means for writing data into one of the recording devices without calculating redundant data, memory means, for storing in a memory a data position where temporary write means writes data, and re-write means for requesting a prefetch of necessary data for calculating the redundant data to the cache memories in recording devices which data were not written into by the temporary write means, reading data from the cache memories in the recording devices according to the data position stored by the memory means at the end of the prefetch of data in the cache memories, calculating the redundant data according to data read, and recording the redundant data in a redundant device.

9. The arrayed recording apparatus of claim 8, wherein the array controller further includes position detect means for detecting rotational position of the recording device, and wherein said re-write means starts to calculate the redundant data according to the rotational position of the redundant device detected by the position detect means.

10. An arrayed recording apparatus comprising:

a plurality of recording devices each of which rotates, has a write area with a plurality of blocks, and stores data in a block unit, wherein each recording device includes a recovery device for storing recovered data, and an array controller for accessing data and redundant data recorded in the blocks of the plurality of recording devices as a group, said array controller including synchronization means for shifting a rotational phase of the recovery device from a rotational phase of the other devices for a predefined period, and re-write means for reading a group of data from the write area, recovering data according to a group of data read from the write area in the predefined period provided by shifting of the rotational phase of the recovery device and the rotational phase of the recording devices, and storing the recovered data into the recovery device.

11. The arrayed recording apparatus of claim 10, wherein the array controller further includes position detect means for detecting a rotational position of the recovery device, and wherein the re-write means start to recover data according to the rotational position detected by the position detect means.

12. The arrayed recording apparatus of claim 10 wherein the array controller further comprises command stack means for stacking commands to access data in the recording devices and executing commands stacked in an order, and wherein the re-write means generates a command to perform a function of the re-write means and outputs the command to the command stack means.

13. The arrayed recording apparatus of claim 12, wherein the command stack means receives the command with a priority and decides the order for executing commands based on the priority, and wherein the re-write means outputs the command with a low priority to the command stack means.

14. An arrayed recording apparatus comprising:

a plurality of recording devices each of which has a write area with a plurality of blocks, and stores data in a block unit, an array controller for accessing data and redundant data recorded in the blocks of the plurality of recording devices as a group, the arrayed controller including initialize means for dividing the write area into a plurality of divided areas so as to define corresponding blocks in the other divided areas to a block in one divided area, and initializing each of the divided areas;

a memory for storing initialize information which indicates whether the block is initialized by the initialize means and for storing divided area information which indicates a divided area when data are recorded in the corresponding block of the other divided area, for each of blocks;

write means, for referring to the initialize information for blocks in the group stored in the memory, for finding all blocks of a group which indicate the initialized status, and for writing data in the blocks of the group found if all the blocks in the group indicate the initialized status; and memory update means for updating initialize information to indicate that blocks are not initialized status for blocks where data are written by the write means, and registering divided area information with the divided area to indicate that data are recorded in the corresponding blocks in the divided area if data are written in the corresponding blocks in other divided area.

15. The strayed recording apparatus of claim 14, wherein the memory stores data on use state which shows whether each block is in use or not, wherein the initialize means initializes a block whose use state in the memory is not in use, and wherein the memory update means updates initializing information on the block which has been initialized by the initialize means.

16. The arrayed recording apparatus of claims 1, 6, 8, 10 or 14, wherein the memory is a non-volatile memory.

17. A recording apparatus which is accessed data in a first size unit from a host machine and accesses data in a second size unit, which is smaller than the first size, in a recording device, comprising:

a cache memory for storing data read from the recording device;

interface means for input;ting and outputting data in the first size unit from and to the host machine using the cache memory;

compare means for comparing data of the first size unit according to a write command with data stored in the cache memory, per the second size unit;

update means for updating data of the recording device per the second size unit based on the comparing result of the compare means.

18. The recording apparatus of claim 17, wherein a plurality of recording devices are provided, wherein the second size unit is an access unit used for accessing each recording device, and wherein the compare means judges whether it is necessary to update data in each recording device based on the comparing result.

19. The recording apparatus of claim 18, further comprising a plurality of recording device control means, corresponding to said plurality of recording devices, for controlling the recording device, wherein each of said recording device control means includes a cache memory, a compare means and an update means, and wherein the interface means divides data in the first size unit into portion of data in the second size unit and distributes each portion of data to the cache memory of each 20. A recording method for an arrayed recording apparatus having a plurality of recording devices for recording data in a write area, each recording device including a temporary write area, and an array controller for controlling accesses to the recording devices, said method comprising the steps of:

(a) temporarily writing data in a temporary write area located in one of said plurality of recording devices instead of writing in the write area of said one of said plurality of recording devices; and (b) re-writing data in the temporary write area into the write area.

21. The recording method of claim 20, further comprising the step of storing a location of data written in the temporary write area and a location of data to be written in the write area and wherein the re-writing step refers to the stored locations to rewrite the data.

22. The recording method of claim 21, further comprising the step of detecting a rotational position of a recording device, and wherein the temporarily writing step starts the writing based on the rotational position detected by the detecting step.

23. The recording method of claim 21, further comprising the step of detecting a rotational position of a recording device, and wherein the re-writing step starts the rewriting based on the rotational position detected by the detecting step.

24. A recording method for an arrayed recording apparatus having a plurality of recording devices for recording data in a write area, at least one of the plurality of recording devices including a temporary write area separate from the write area, and an array controller for controlling accesses to the recording devices, said method comprising the steps of:

(a) temporarily writing data in the temporary write area of one of the recording devices without calculating redundant data;

(b) storing a location of data written by the temporarily writing step;

(c) reading data from the stored location;

(d) calculating redundant data based on the data read by the reading step; and (e) re-writing the redundant data calculated by the calculating step to a redundant device.

25. The recording method of claim 24, further comprising the step of controlling synchronization of rotation of the recording devices and the redundant device to delay a rotational phase of the redundant device from that of the recording devices, and wherein the calculating step calculates the redundant data in the delayed period.

26. A recording method for an arrayed recording apparatus having a plurality of recording devices for recording data in a write area, and an array controller for controlling accesses to the recording devices, said method comprising the steps of:

(a) temporarily writing data through a cache memory in a specified recording device without calculating redundant data;

(b) prefetching data needed for calculating redundant data into cache memories from the other recording devices which are not specified for writing data;

(c) calculating the redundant data according to the data in the cache memories; and (d) writing the redundant data to one of the recording devices.

27. A recording method for an arrayed recording apparatus having a plurality of recording devices for recording data in a write area, and an array controller for controlling accesses to the recording devices, said method comprising the steps of:

(a) dividing the write area into a plurality of divided areas so as to provided corresponding redundant groups among the divided areas;

(b) initializing the divided areas;

(c) searching the corresponding redundant groups in the divided areas to locate a redundant group which is initialized;

(d) writing data in the initialized redundant group found by the searching step; and (e) storing the divided area where data are written by the writing step in the original redundant group.

28. A recording method for a recording apparatus which receives data in a first size unit from a machine into a buffer and accesses data in a second size unit in a recording device, comprising the steps of:

(a) reading data in the second size unit a plurality of times into the buffer from the recording device;

(b) transferring data in the first size unit to said machine;

(c) receiving updated data in the first size unit from the machine;

(d) comparing said updated data and data in the buffer per the second size unit; and (e) updating data per the second size unit in the recording drive if the comparing result per the second size unit by the comparing step shows a difference.

* * * * *